United States Patent
Asahi et al.

(10) Patent No.: US 7,295,227 B1
(45) Date of Patent: *Nov. 13, 2007

(54) APPARATUS FOR ASSISTING STEERING OF VEHICLE WHEN BACKING

(75) Inventors: Goro Asahi, Kariya (JP); Hisashi Kuriya, Kariya (JP); Masashi Ushino, Kariya (JP); Tomio Kimura, Kariya (JP); Kousuke Teramura, Kariya (JP); Kazunori Shimazaki, Kariya (JP); Kanji Hattori, Kariya (JP); Satoshi Yamada, Kariya (JP)

(73) Assignee: Kabushiki Kaisha Toyoda Jidoshokki Seisakusho, Kariya-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/484,316

(22) Filed: Jan. 18, 2000

(30) Foreign Application Priority Data

Jan. 19, 1999 (JP) ................................. 11-010452
May 21, 1999 (JP) ................................. 11-142290

(51) Int. Cl.
*H04N 7/00* (2006.01)
*H04N 7/18* (2006.01)

(52) U.S. Cl. ........................................ 348/118; 701/41
(58) Field of Classification Search ................ 348/118, 348/113, 115, 140, 333, 148, 143, 119, 116, 348/42, 47, 149; 180/204, 167, 168, 169, 180/234; 701/22, 41, 58, 60, 23, 116, 117; 364/424, 460; 340/932, 435, 903, 436, 438, 340/549

See application file for complete search history.

(56) References Cited

U.S. PATENT DOCUMENTS 4,214,266 A * 7/1980 Myers ......................... 348/140

(Continued)

FOREIGN PATENT DOCUMENTS

EP     0 830 985 A1    3/1998

(Continued)

OTHER PUBLICATIONS

Patent Abstracts of Japan, vol. 1996, No. 1, Jan. 31, 1996, Abstract Only of Japanese Appl. No. 07-239999, publ. Sep. 12, 1995.

(Continued)

*Primary Examiner*—Tung Vo
*Assistant Examiner*—Behrooz Senfi
(74) *Attorney, Agent, or Firm*—Morgan & Finnegan, L.L.P.

(57) ABSTRACT

A steering assist apparatus that assists a driver when backing a vehicle in an S-shaped path or parallel parking. The apparatus displays guidance marking on a monitor screen and the driver refers to the guidance marking, which permits the driver to easily back the vehicle to a desired position. The apparatus includes a camera, a monitor, an angle sensor, obstacle sensors, an image processing unit, a controller and a monitor controller. The image processing unit computes the predicted path of the vehicle at the current wheel angle. The monitor shows an image captured by the camera. The image processing unit generates data representing a guidance marking based on the predicted path and superimposes the marking on the monitor screen. The location of the marking on the screen is determined based on the current wheel angle. The marking represents part of the predicted path. Specifically, the marking matches the width of the vehicle. In the monitor screen, a marking is separated from the rear bumper of the vehicle by a distance corresponding to the wheelbase of the vehicle.

21 Claims, 16 Drawing Sheets

U.S. PATENT DOCUMENTS

| | | | | |
|---|---|---|---|---|
| 4,566,032 A | * | 1/1986 | Hirooka et al. | 358/103 |
| 4,735,274 A | * | 4/1988 | Good et al. | 180/204 |
| 5,485,378 A | * | 1/1996 | Franke et al. | 701/41 |
| 5,646,639 A | * | 7/1997 | Koie | 345/7 |
| 5,670,935 A | * | 9/1997 | Schofield et al. | 340/461 |
| 5,815,825 A | * | 9/1998 | Tachibana et al. | 701/23 |
| 5,945,799 A | * | 8/1999 | Shimizu | 318/587 |
| 5,949,331 A | * | 9/1999 | Schofield et al. | 340/461 |
| 6,170,591 B1 | * | 1/2001 | Sakai et al. | 180/204 |
| 6,223,847 B1 | * | 5/2001 | Shimizu et al. | 180/204 |
| 6,275,754 B1 | * | 8/2001 | Shimizu et al. | 701/41 |
| 6,564,130 B2 | * | 5/2003 | Shimazaki et al. | 701/41 |
| 6,611,744 B1 | * | 8/2003 | Shimazaki et al. | 701/41 |

FOREIGN PATENT DOCUMENTS

| | | |
|---|---|---|
| JP | SHO 60-95699 | 6/1985 |
| JP | 1-141137 | 6/1989 |
| JP | 02-36417 | 8/1990 |
| JP | 7-229961 | 8/1995 |
| JP | 8-2357 | 1/1996 |
| JP | 10-117341 | 5/1998 |
| JP | 10-175482 | 6/1998 |
| JP | 10-244891 | 9/1998 |
| JP | 10-264840 | 10/1998 |
| JP | 11-334470 | 12/1999 |
| JP | 2000-72019 | 3/2000 |
| JP | 2000-78566 | 3/2000 |
| JP | 2000-79860 | 3/2000 |

OTHER PUBLICATIONS

Patent Abstracts of Japan, vol. 17, No. 652, Dec. 3, 1993, Abstract Only of Japanese Appl. No. 5-213113, publ. Aug. 24, 1993.

* cited by examiner

L1 - Inner Rear Wheel
L2 - Outer Rear Wheel
L3 - Inner Front Wheel
L4 - Outer Front Wheel
L5 - Rear Axle Center

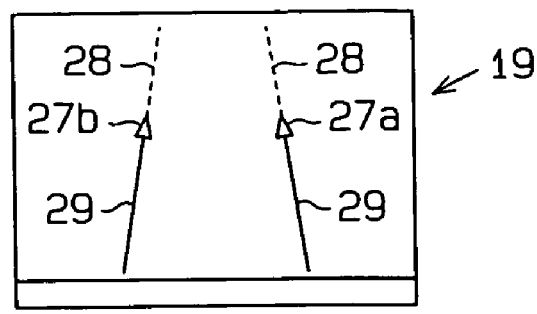
Fig.20A
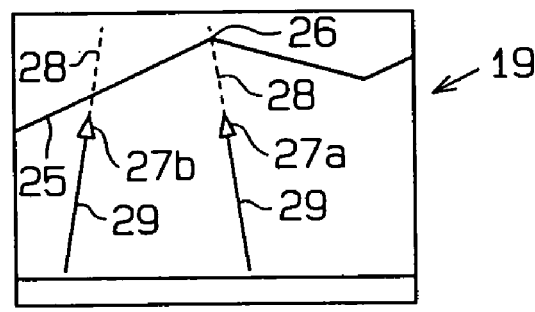
Fig.20B
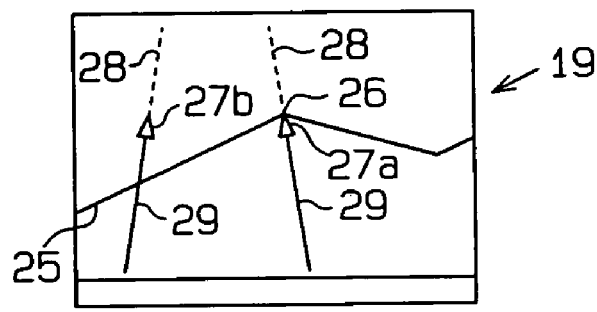
Fig.20C
Fig.21
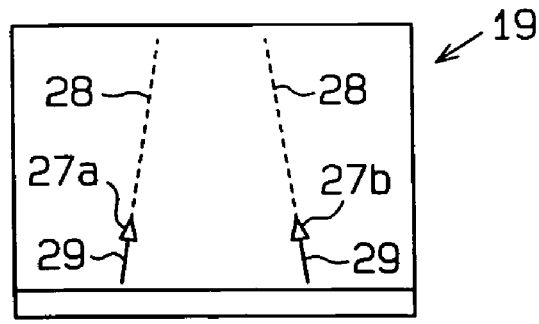

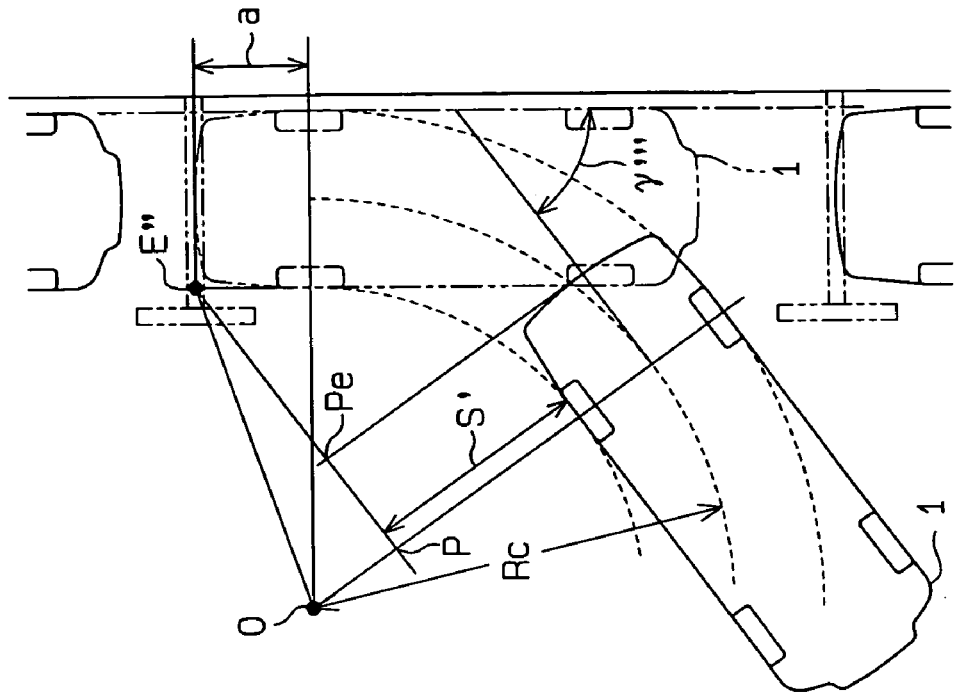
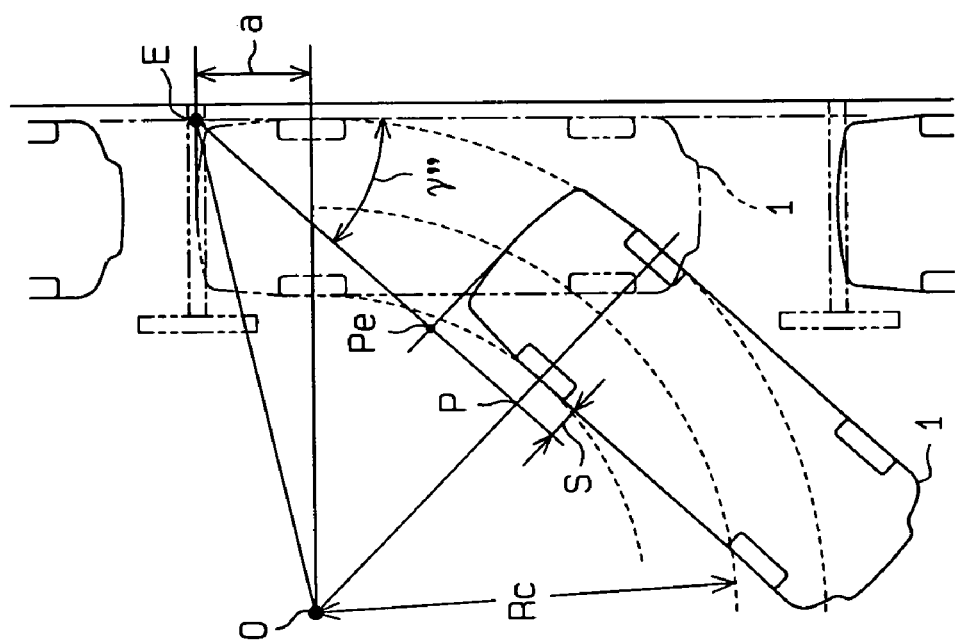

APPARATUS FOR ASSISTING STEERING OF VEHICLE WHEN BACKING

BACKGROUND OF THE INVENTION

The present invention relates to an apparatus for assisting steering when a vehicle is moving backward. More specifically, the present invention relates to a steering assist apparatus that includes a camera for capturing the view from the rear and a monitor for displaying the captured view along with marking for assisting the driver.

In the prior art, apparatuses for showing the view from the rear of a vehicle have been proposed. Such an apparatus allows the driver to see the view from the vehicle rear without actually turning around. Japanese Examined Patent Publication No. 2-36417 discloses a rear monitoring apparatus, which includes a video camera for capturing view from the rear of the vehicle, a video monitor for showing the captured view and a sensor for outputting signals representing the angle of vehicle wheels. The apparatus generates marker signals based on signals from the wheel angle sensor and superimposes a marker on the video monitor. The positions of the markers on the monitor correspond to the direction in which the vehicle is being backed. The direction is determined in accordance with the steered angle of the vehicle wheels. The apparatus includes a read only memory (ROM), which stores steered angle data of the vehicle wheels and marker position data. When the vehicle is moving backward, the course of the vehicle is predicted based on the steered angle data. The predicted course is displayed by rows of the markers superimposed on the monitor screen showing the image captured by the video camera.

Japanese Unexamined Patent Publication No. 10-175482 discloses an apparatus for assisting the view from the rear of a vehicle. This apparatus includes a detector for detecting the angle of the front wheels, a vehicle speed sensor, a camera for capturing the view from the rear of the vehicle and monitor for displaying the view. The apparatus also includes a computer. When the vehicle is moving backward, the computer computes the path of the rear wheels based on the steered angle of the front wheels. The predicted path is converted into path image data, which represents the predicted path as viewed from the rear camera. The path image data is further converted into linear marking data, which corresponds to the monitor screen. The linear marking data is superimposed on the image of the view from the vehicle rear shown on the monitor screen.

Japanese Unexamined Patent Publication No. 10-244891 discloses a parking assist apparatus. This apparatus includes first and second image pickup means provided at the sides of the vehicle to capture the image of the vehicle surroundings. The apparatus superimposes lines on the image captured by the image pickup means. The lines permit the driver to judge whether parallel parking is possible.

The apparatuses of the publications No. 2-36417 and No. 10-175482 both show the rear view captured by a camera and predict the path of the vehicle or the path of the rear wheels based on the current wheel angle. The apparatuses then superimpose the predicted path on the monitor screen. The superimposed path does not correspond to the vehicle length or the wheelbase. When passing another car in a winding road such as a mountain road, the driver may have to move his vehicle backward until the vehicle reaches a spot that is wide enough for two vehicles to pass each other. At this time, the apparatuses of the publications No. 2-36417 and No. 10-175482 will show the view from the rear and the predicted path on a monitor. Accordingly, the driver will know whether maintaining the angle of the front wheels will cause the vehicle to leave the road.

However, as shown in FIG. 26, all the currently predicted data of a path 41 representing the vehicle path or the predicted rear wheel path is shown on a monitor screen 42. Thus, if the curvature of the road 43 is not constant for a relatively long distance and the wheel angle does not correspond to the curvature of the road 43, the upper end of the superimposed path 41 does not match the road 43 on the screen 42. Generally, the curvature of a road is not constant for a long distance on winding roads such as mountain roads. Therefore, the superimposed path 41 is often partly off of the a road on the screen 42, which at least permits the driver to realize that maintaining the current wheel angle will cause the vehicle to leave the road. However, the superimposed path 41 does not give the driver information necessary for judging how he should manipulate the steering wheel. In other words, the superimposed path 41 cannot be used for determining the steering amount of the steering wheel.

When parallel parking a vehicle, the driver has to switch the direction of steering. However, the superimposed path 41 does not help the driver to judge when to switch the steering direction.

The apparatus of the publication No. 10-244891 assists the driver when parking a vehicle. The apparatus needs two image pickup means to capture front and rear images from the vehicle side. The apparatus shows a line for indicating whether parallel parking is possible. The computation of the line is complicated.

SUMMARY OF THE INVENTION

Accordingly, it is an objective of the present invention to provide an apparatus for assisting steering of vehicle when vehicle is moving backward, which provides guidance on a monitor screen for permitting a driver to easily move the vehicle to a desired position when the driver moves the vehicle backward along an S-shaped corner or when the driver parallel parks the vehicle.

To achieve the foregoing and other objective and in accordance with the purpose of the present invention, an apparatus for aiding steering when a vehicle is being driven in reverse is provided. The moving direction of the vehicle is determined in response to the position of steered wheels. The apparatus includes a camera for capturing an image of an area behind the vehicle, a monitor for displaying the image captured by the camera and a display control unit for displaying a guide marking for aiding steering. The marking and the image are simultaneously displayed on the monitor when the vehicle is being driven in reverse. The marking provides a driver with at least first indication of the width of the vehicle and a second indication of a prospective path of the vehicle corresponding to the position of the steered wheels.

The present invention may be another apparatus for aiding steering when a vehicle is being driven in reverse. The moving direction of the vehicle is determined in response to the position of steered wheels. The apparatus includes a camera for capturing an image of an area behind the vehicle, a monitor for displaying the image captured by the camera, and a display control unit for displaying a guide marking that is fixed at a predetermined position with respect to the monitor screen for aiding a driver in parking. The control unit displays the guide marking and the image simultaneously on the monitor when the vehicle moves in reverse. The parallel parking is completed by causing the marking to coincide with a target point in the image, followed by backing while keeping the steered wheels turned at their maximum angle.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with marking and advantages thereof, may best be understood by reference to the following description of the presently preferred embodiments together with the accompanying drawings in which:

FIGS. 20A, 20B and 20C are diagram showing operations of guidance marking on a monitor screen when parallel parking a vehicle;

FIG. 21 is a diagram showing a monitor screen showing markers according to a fifth embodiment;

FIG. 23A is a diagram for calculating the location of a marker on the monitor screen according to a sixth embodiment;

FIG. 23B is a diagram for calculating the location of a marker on the monitor screen when the target point is different from that of FIG. 23A;

DETAILED DESCRIPTION OF THE PREFERRED EMBODIMENTS

Figure 1:
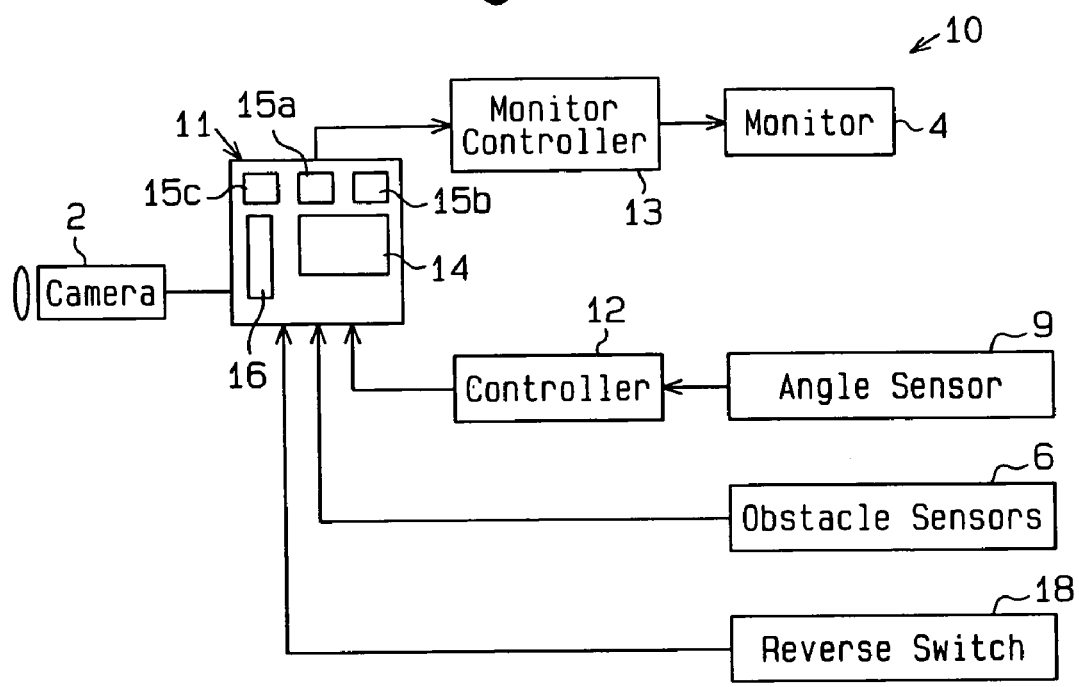
FIG. 1 is a block diagram showing a steering assist apparatus according to a first embodiment.

A first embodiment according to a first embodiment of the present invention will now be described with reference to FIGS. 1 to 13. As shown in FIG. 2, a vehicle 1 has a monochrome camera 2 for capturing the view from the vehicle rear. A rear bumper 3 is at the nearest end of the view of the camera 2. The distance between the bumper 3 and the farthest extend of the camera view is greater than the length of the vehicle 1.

A monitor 4 for showing the image captured by the camera 2 is located in the passenger compartment of the vehicle 1. The monitor 4 is a color liquid crystal display and is also used as the monitor of a navigation system. The monitor 4 is normally used as the navigation system monitor. When a shift lever 5 is shifted to a reverse position, the monitor 4 shows the image captured by the camera 2.

Obstruction sensing means, which are obstruction sensors 6, are arranged in the corners of the vehicle 1. The obstruction sensors 6 are, for example, conventional sensors such as ultrasonic sensors. When an obstruction is in a range between a first distance (for example, about fifty centimeters) and a second distance (for example, about twenty centimeters) from one of the sensors 6, the sensor 6 outputs a first obstruction signal. If the obstruction is closer to the sensor 6 than the second distance, the sensor 6 outputs a second obstruction signal.

Steered wheels, which are front wheels 7a in this embodiment, are steered by manipulating steering means, which is a steering wheel 8 in this embodiment. The steered angle α of the front wheels 7a is computed by multiplying the rotated angle θ of the steering wheel 8 by a coefficient K. That is, the angle of the front wheels 7a is represented by Kθ. The rotated angle of the steering wheel 8 is detected by wheel angle detecting means, which is an angle sensor 9 in this embodiment.

Figure 2:
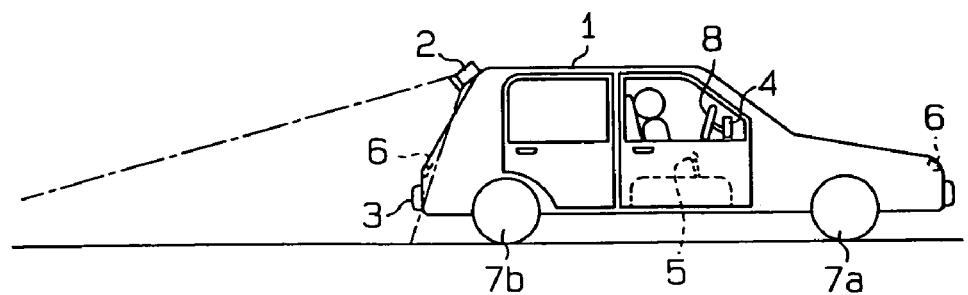
FIG. 2 is a schematic side view showing a vehicle having the apparatus of FIG. 1.

As shown in FIG. 1, a steering assist apparatus 10 includes the camera 2, the monitor 4, the angle sensor 9, the obstruction sensors 6, a display control means, a controller 12 and a monitor controller 13. The display control means is an image processing unit 11 in this embodiment. The controller 12 receives signals from the angle sensor 9 and computes the angle α of the front wheels 7a based on the angle θ of the steering wheel 8 and then send the computed angle α to the image processing unit 11. The monitor controller 13 inputs image signals from the image processor and a car navigator system (not shown). The monitor controller 13 selectively shows one of the image signals on the monitor 4.

The image processing unit 11 includes an arithmetic circuit, or central processing unit (CPU) 14, a program memory 15a, a working memory 15b, an image memory 15c and an image processor 16. The CPU 14 adjusts a predicted path of the vehicle 1 and generates display data. The program memory 15a is a read only memory (ROM) for storing control programs. The working memory 15b is a random access memory (RAM) for temporarily storing computation results of the CPU 14. The image memory 15c is a random access memory. The image processor 16 processes image data from the camera 2 and stores the data in the image memory 15c. The CPU 14 operates based on the program data stored in the program memory 15a.

The CPU 14 computes and predicts the backward path of the vehicle 1 with the front wheels 7a steered at an angle α based on signals from the controller 12. Superimposed marking in FIG. 3, which is a guide frame 17 in this embodiment, represents the width of the vehicle 1 and is moved on the screen in accordance with the steering angle α. Specifically, the CPU 14 computes data representing the guide frame 17 based on the predicted path. The CPU 14 is connected to a reverse switch 18 and an input interface (not shown). The reverse switch 18 detects whether the shift lever 5 is in the reverse position and sends a signal to the CPU 14. When receiving a signal showing that the shift lever 5 is in the reverse position from the switch 18, the CPU 14 generates the guide frame data at predetermined intervals.

Figure 3:
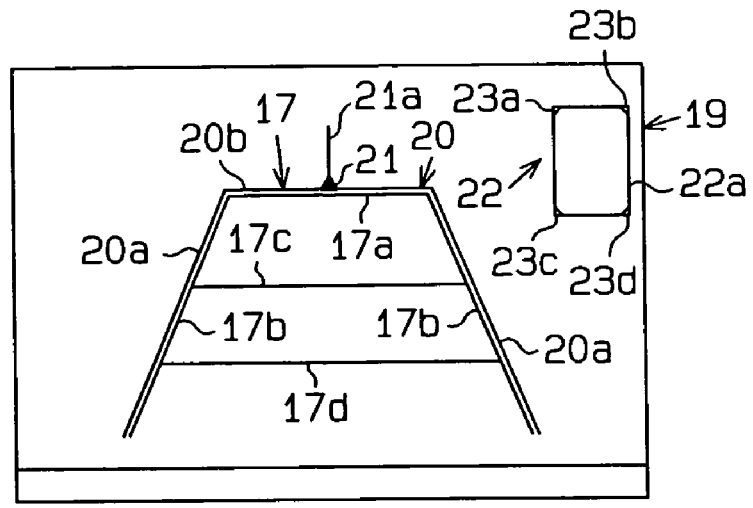
FIG. 3 is a schematic view showing the screen of a monitor.
Figure 4:
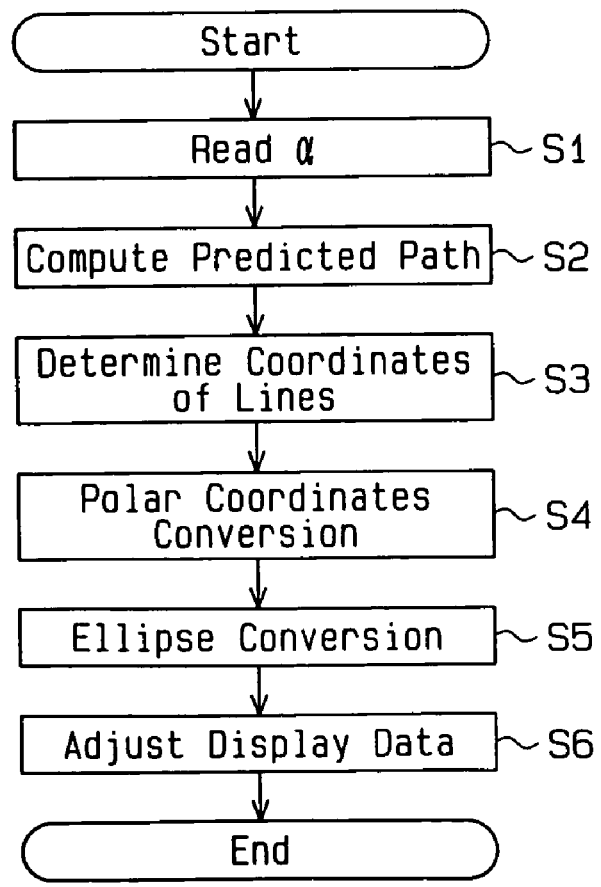
FIG. 4 is a flowchart showing a routine for generating data for guidance marking shown on the monitor screen.
Figure 5:
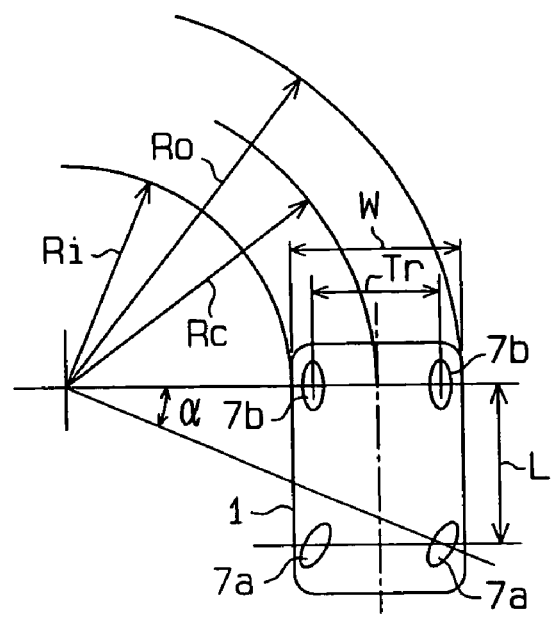
FIG. 5 is a schematic view showing the relationship between the wheel angle and the turn radius of vehicle wheels.
Figure 8:
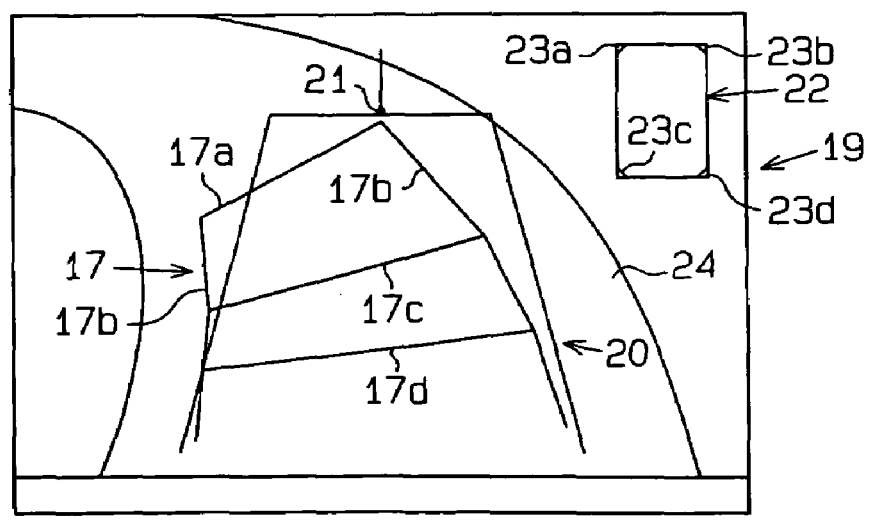
FIG. 8 is a diagram showing a state of the monitor screen corresponding to the state A of FIG. 7.
Figure 9A:
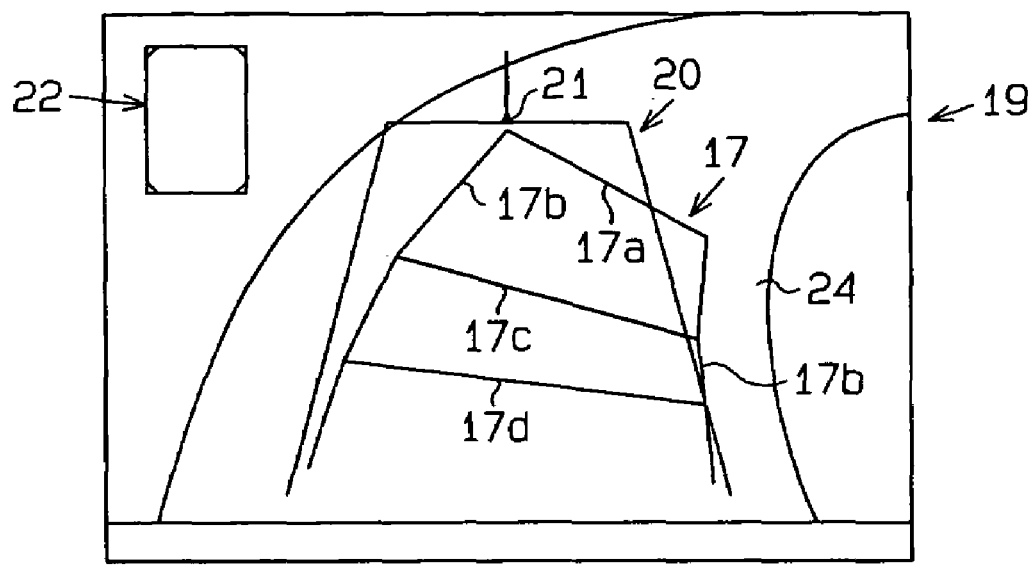
FIG. 9A is a diagram showing a state of the monitor screen corresponding to the state B of FIG. 7.

FIG. 3 shows a screen 19 of the monitor 4. The guide frame 17 includes lateral line 17a and a pair of side guide lines 17b. FIG. 3 shows the guide frame 17 when the angle α is zero degrees, or when the angle of the front wheels 7a are directed straight ahead. The guide frame 17 is moved in accordance with the steering angle α as shown in FIGS. 8 and 9A. The length of the lateral line 17a represents the width of the vehicle 1. In the image captured by the camera 2 shown in FIG. 3, the lateral line 17a is spaced apart from the rear bumper 3, by a distance corresponding to the wheelbase of the vehicle 1. The side lines 17b extend from the ends of the lateral line 17a to the rear bumper 3 along the predicted path. The guide frame 17 preferably has cross lines 17c, 17d connecting the side lines 17b.

The position of the guide frame 17 when the steering angle α is zero degrees will be referred to as reference position. The guide frame 17 is swung to left and to right in accordance with the steering angle α.

The program memory 15a stores data representing a fixed frame 20. The fixed frame 20 is shown on the screen 19 and is not swung in accordance with the rotation of the steering wheel 8. The fixed frame 20 includes a pair of guide lines, which are side lines 20a, and a lateral line 20b, which connects the upper ends of the side lines 20a. A marker 21 is located in the center of the lateral line 20b. The mark 21 includes a line 21a, which extends vertically, or perpendicularly to the lateral line 20b. On the screen 19, the upper side represents the rearward direction of the vehicle 1.

The marker 21 assists the driver to move the vehicle 1 backward when the driver is parking the vehicle 1. For example, the driver matches the marker 21 with a corner of a parking space and then parks the vehicle 1 in the parking space by moving the vehicle 1 backward while rotating the steering wheel 8 to the maximum rotation position.

Figure 13:
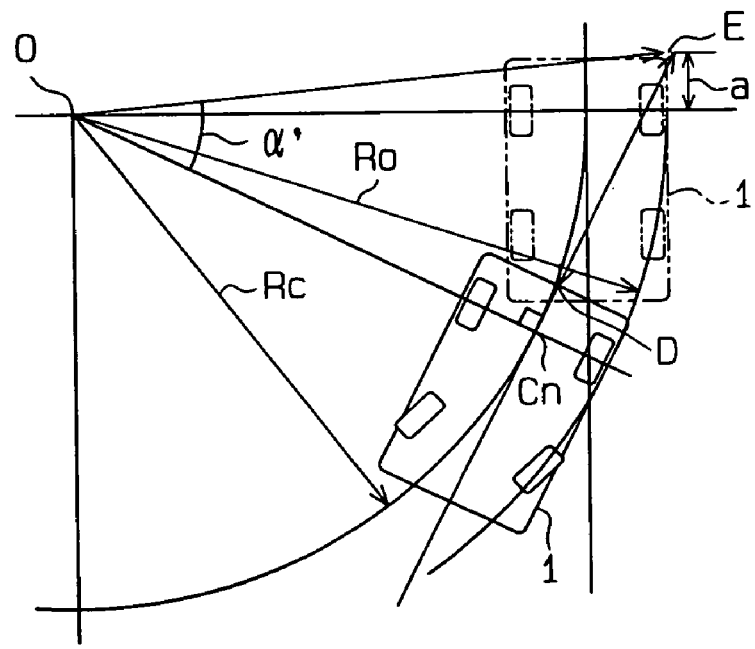
FIG. 13 is diagram for calculating the location of a marker on the monitor screen.
Figure 14:
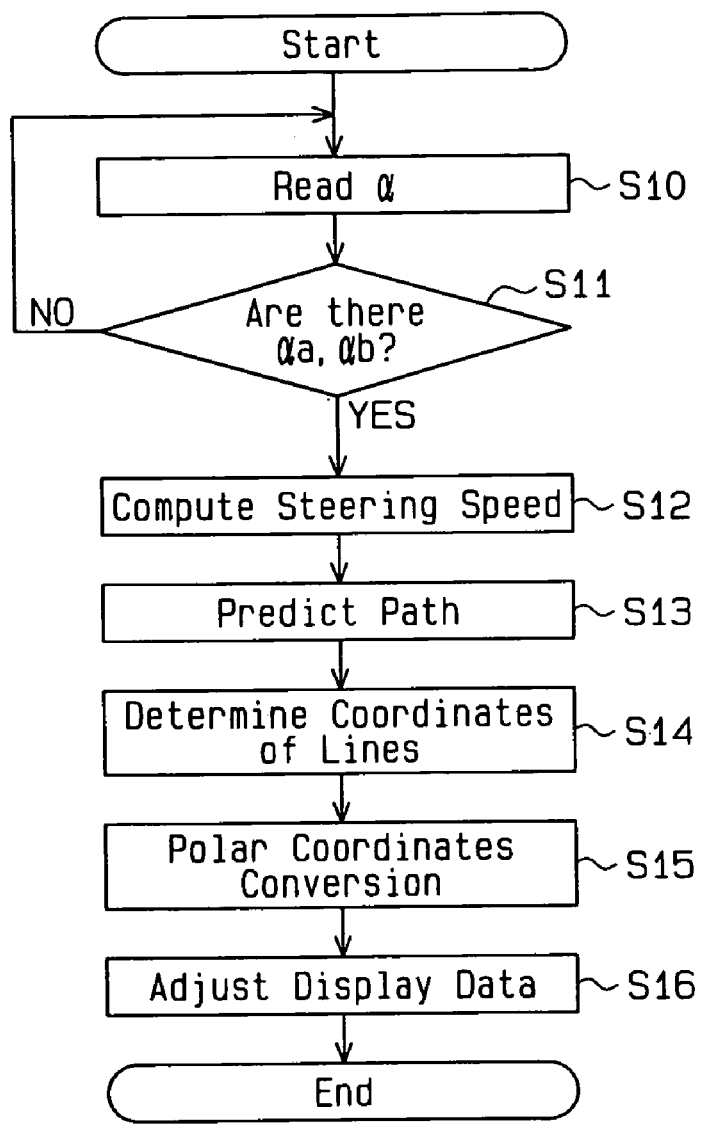
FIG. 14 is a flowchart showing a routine according to a second embodiment.

The location of the marker 21 is calculated in the following manner. The dotted line in FIG. 13 shows the vehicle 1 at a parked position. FIG. 13 also shows another position of the vehicle 1 by solid lines. When moving the vehicle 1 from the parked position to the position of the solid lines, the driver maximally steers the front wheels 7a and advances the vehicle 1. The path of the vehicle 1 at this time is the same as the path of the vehicle 1 when the vehicle 1 is moved from the position of the solid line to the parked position of the dotted line. Thus, the calculation of the marker 21 will be described referring to a case when the vehicle is moved from the dotted line position to the solid line position in FIG. 13.

As shown in FIG. 13, a corner of the vehicle 1 when parked at the dotted line position is defined as a point E. The distance a between the point E and the axis of the rear axle is the rear overhang of the vehicle 1. If the steering wheel 8 is maximally rotated when the vehicle is moved, the axial center of the rear axle is moved along a circle the radius of which is Rc. When the tangent of the circle of the radius Rc includes the point E, the axial center of the rear axle is defined as Cn. A point on the tangent separated from the point Cn by the distance a is defined as a point D. The distance DE between the point D and the point E is calculated.

A line between the center O of the circle of the radius Rc and the axle axial center Cn is defined as a line OCn. A line between the center O and the point E is defined as a line OE. The angle defined by the line OCn and the line OE is defined as an angle α'. The following equations are satisfied.

$$\overline{OE} = \sqrt{(RO^2 + a^2)}$$

$$\cos\alpha' = \overline{OCn}/\overline{OE} Rc/\sqrt{(RO^2 + a^2)}$$

$$\therefore \alpha' = \cos^{-1}\{Rc/\sqrt{(RO^2 + a^2)}\} \quad (1)$$

Therefore $$\overline{CnE} = \overline{OCn}\tan\alpha' = Rc\tan\alpha'$$

$$\therefore \overline{DE} = Rc\tan\alpha' - a \quad (2)$$

When the angle defined by the line OE and the line OCn is the angle α', the position of the marker 21 on the screen 19 corresponds to a point that is separated from the rear bumper 3 of the vehicle 1 by the length of the line DE. In the above equations, the length of the line CnE is a value that is adjusted through experiments. The length of the line CnE is adjusted in consideration of a case where the angle of approach is relatively great.

In this embodiment, when the angle α is zero degrees, or when the guide frame 17 is at the reference position, the lateral line 17a matches the lateral line 20b of the fixed frame 20 and the side lines 17b match the side lines 20a of the fixed frame 20. FIG. 3 shows the guide frame 17 at the reference position. To show both frames 17 and 20, the frames are slightly displaced from each other in FIG. 3.

The program memory 15a stores display reference data for displaying an obstacle finder 22 on the screen 19. The obstacle finder 22 shows whether any of the sensors 6 is outputting either the first or second obstacle signals. The obstacle finder 22 includes a frame 22a representing the shape of the vehicle 1 and corner markers 23a to 23d representing the obstacle sensors 6.

The CPU 14 sends data representing the guide frame 17, the fixed frame 20 and the marker 21 to the monitor controller 13 via the output interface. The monitor controller superimposes the frames 17, 20 and the marker 21 on the image of the camera 2. The CPU 14 also sends data representing the obstacle finder 22 to the monitor controller 13. The monitor controller 13 displays the view of the camera 2, and images of the guide frame 17, the fixed frame 20, the marker 21 and the obstacle finder 22 on the monitor 4. The obstacle finder 22 does not interfere with the guide frame 17 and the fixed frame 20.

Since the camera 2 is a monochrome camera, the image is in black and white. The data for the guide frame 17, the fixed frame 20, the marker 21 and the obstacle finder 22 are color. Thus, the guide frame 17, the fixed frame 20, the marker 21 and the obstacle finder 22 are superimposed in color on the black and white image shown on the screen 19 of the monitor 4. The color of the guide frame 17 is basically different from the color of the fixed frame 20. The marker 21 is shown in the same color as the color of the fixed frame 20. The color of the side lines 17b is the same as the color of the fixed frame 20 at portions between the cross lines 17c and 17d. In this embodiment, the guide frame 17 is green except for the portions between the cross lines 17c, 17d. The segments between the cross lines 17c and 17d, the marker 21 and the fixed frame 20 are shown in yellow.

If none of the obstacle sensors 6 outputs obstacle signals, the CPU 14 displays the corner markers 23a to 23d, which represent the sensors 6, by outputting obstacle checking data to the monitor controller 13, and all the corner markers 23a to 23d have the same appearance. When receiving the first or second obstacle signal from one or more of the sensors 6, the CPU 14 outputs corresponding obstacle checking data to the monitor controller 13. Accordingly, the corner marker corresponding to the sensor 6 sending the first or second obstacle signal is distinguished from the other corner markers on the screen 19. For example, a corner marker is displayed in orange when the corresponding sensor 6 outputs a first obstacle signal and the corner marker is displayed in red when the corresponding sensor 6 outputs a second obstacle signal.

Figure 6:
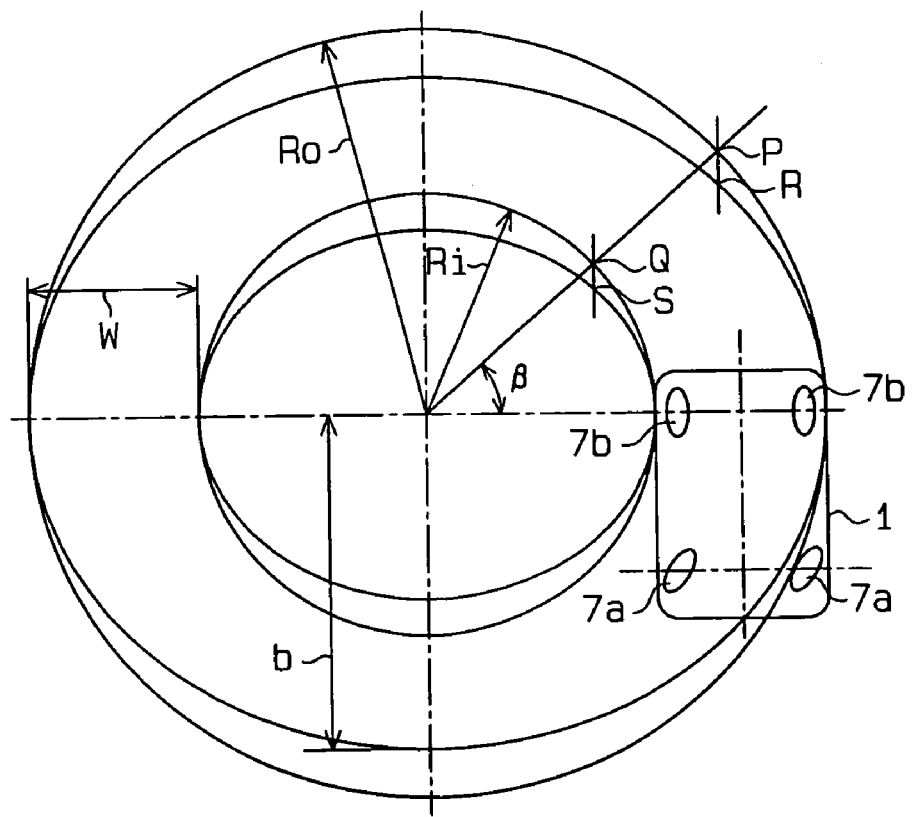
FIG. 6 is a diagram showing the relationship between polar coordinates and an ellipse.

The CPU 14 computes the predicted path of the sides of the vehicle when the vehicle 1 is moved backward with the front wheels 7a steered by the angle α. The predicted path is expressed in polar coordinates. The predicted path is substantially circular. The lateral line 17a of the frame 17 is drawn between points in the predicted paths of the sides of the vehicle. The points are on the same radius (from the center of the turn) and represent a line separated from the bumper 3 substantially by the length of the wheelbase. The side lines 17b match the predicted path from the ends of the lateral line 17a to the sides of the bumper 3. The CPU 14 compresses the image of the predicted path circle in the direction of the vehicle's movement by a predetermined ratio. That is, the CPU 14 converts the circle of the predicted path into an ellipse as shown in FIG. 6. Part of the ellipse corresponding to the size of the guide frame 17 is converted into a perspective view and is superimposed on the monitor screen 19 as the guide frame 17. The location of the guide frame 17 on the screen 19 is slightly displaced rearward from its accurate position.

The operation of the steering assist apparatus 10 will now be described.

When the shift lever 5 is in the reverse position, the reverse switch 18 sends a signal indicating that the lever 5 is in the reverse position to the CPU 14. In this state, the CPU 14 executes the routine of the flowchart shown in FIG. 4 at predetermined intervals (for example, thirty-three milliseconds) for generating data representing the guide frame display. At step S1, the CPU 14 reads the data of the steered angle α from the controller 12. At step S2, the CPU 14 computes the predicted path of the sides of the vehicle 1 while assuming that the angle α will not be changed.

The width and the wheelbase of the vehicle 1 are defined as W and L, respectively. The distance between the radial centers of the rear wheels 7b is defined as Tr. The distance between the center of the turn and the axial center of the rear axle, or the radius of turn, is defined as a radius Rc. The distance between the center of the turn and the intersection point of the outer side of the vehicle body and the line extended from the rear axle axis is defined as a radius Ro. The distance between the center of the turn and the intersection point of the inner side of the vehicle body and the line extended from the rear axle axis is defined as a radius Ri. The radiuses Rc, Ro and Ri are expressed by the following equations.

$$Rc = (L/\tan \alpha) - (Tr/2) \quad (3)$$

$$Ro = Rc + W/2 = (L/\tan \alpha) - (Tr/2) + W/2 \quad (4)$$

$$Ri = Rc - W/2 = (L/\tan \alpha) - (Tr/2) - W/2 \quad (5)$$

The CPU 14 computes the predicted path based on these equations and moves to step S3. At step S3, the CPU 14 determines the coordinates of the ends of each line 17a, 17c, 17d.

At step S4, the CPU 14 converts the coordinates of the predicted path into polar coordinates. At step S5, the CPU 14 converts the circle of the predicted path into an ellipse. As shown in FIG. 6, the origin of the polar coordinates matches the center of the circles of radiuses Rc, Ro and Ri. The x axis of the polar coordinates matches the axis of the rear axle. FIG. 6 shows a line that makes an angle β from the x axis. The coordinates of the node P of the line and the circle of the radius Ro is defined as (Ro, β). The coordinates of the node Q of the line and the circle of the radius Ri is defined as (Ri, β).

The polar coordinates (Ro, β) of the node P and the coordinates (x, y) of the node P in the x and y coordinates satisfy the following equation.

$$x = Ro \cos \beta, \, y = Ro \sin \beta$$

Likewise, the polar coordinates (Ri, β) of the node Q and the coordinates (x, y) of the node Q in the x and y coordinates satisfy the following equation.

$$x = Ri \cos \beta, \, y = Ro \sin \beta$$

When the circle of FIG. 6 is converted into the ellipse, the nodes P, Q are shifted to nodes R, S.

The coordinates (X, Y) of the node R in the x and y coordinates satisfy the following equations.

$$X = Ri \cos \beta, \, Y = b \sin \beta$$

Likewise, the coordinates (X, Y) of the node S in the x and y coordinates satisfy the following equations.

$$X = Ri \cos \beta, \, Y = (b - W)\sin \beta$$

Wherein the value b satisfies the following equation.

$$b = Ro(\text{minor axis/major axis})$$

The CPU 14 converts the circle of the predicted path into an ellipse and converts the coordinates of the ellipse into polar coordinates. The CPU 14 then generates the guide frame data based on the converted ellipse coordinates. The ratio of the minor axis to the major axis (compression ratio) is previously computed through test drives of the vehicle 1 and is stored in the program memory 15a.

The CPU 14 moves to step S6 and displaces the guide frame 17 from its accurate location, or upward in the screen 19 of the monitor 4, by a predetermined amount. The displace amount is previously computed through test drives and is stored in the program memory 15a.

The CPU 14 outputs the data of the guide frame 17, the fixed frame 20, the marker 21 and the obstacle finder 22 to the monitor controller 13. The monitor controller 13 superimposes the data onto the image captured by the camera 2 displayed on the monitor 4.

Figure 7:
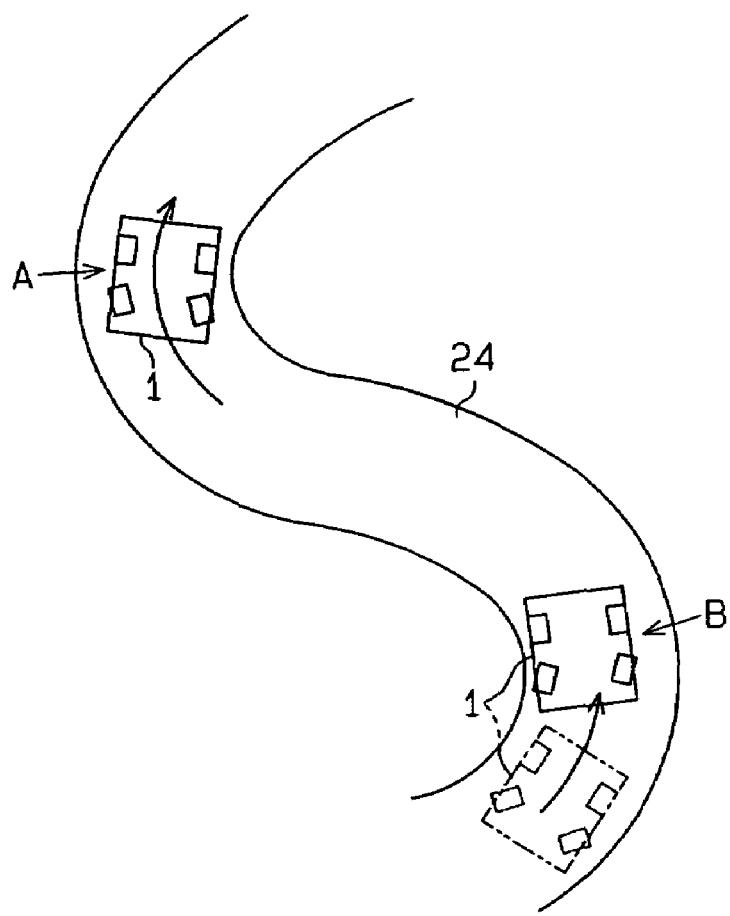
FIG. 7 is a diagram showing a vehicle when the vehicle is moving backward in an S-shaped road.

The operation of the steering assist apparatus 10 when the vehicle 1 is moving backward in an S-shaped road is as follows. When the driver shifts the shift lever 5 into reverse, the guide frame 17, the fixed frame 20, the marker 21 and the obstacle finder 22 appear on the screen 19 of the monitor 4. FIG. 7 illustrates a case where the vehicle 1 is moved backward along an S-shaped road 24. In this case, the driver uses the guide frame 17 and ignores the fixed frame 20 and the marker 21.

FIG. 8 illustrates a state of the screen 19 when the vehicle 1 is at a position A in FIG. 7, or when the vehicle 1 is moving through a rightward corner. FIG. 9A illustrates a state of the screen 19 when the vehicle 1 is at a position B in FIG. 7, or when the vehicle 1 is moving through a leftward corner. The fixed frame 20 and the reference marker 21 are not deformed regardless of the steering angle $\alpha$. The guide frame 17 is deformed in accordance with the angle $\alpha$.

The driver manipulates the steering wheel 8 such that the lateral line 17a of the frame 17 is located at the center of the road 24. The guide frame 17 is generated based on the predicted path, which is calculated according to the current angle $\alpha$ of the front wheels 7a. Thus, if the guide frame 17 is located in the center of the road 24, the vehicle 1 will not deviate from the road 24 until the vehicle 1 reaches the location indicated by the frame 17. However, the curvature of the road 24 is not constant. Therefore, if the angle $\alpha$ is not changed, the guide frame 17 will indicate that the path of the vehicle 1 deviate from the road 24. Manipulating the steering wheel 8 to adjust the lateral line 17a to the center of the road 24 changes the wheel angle $\alpha$ to a value corresponding to the curvature of the road 24. As a result, the vehicle 1 is moved backward along the road 24.

Figure 9B:
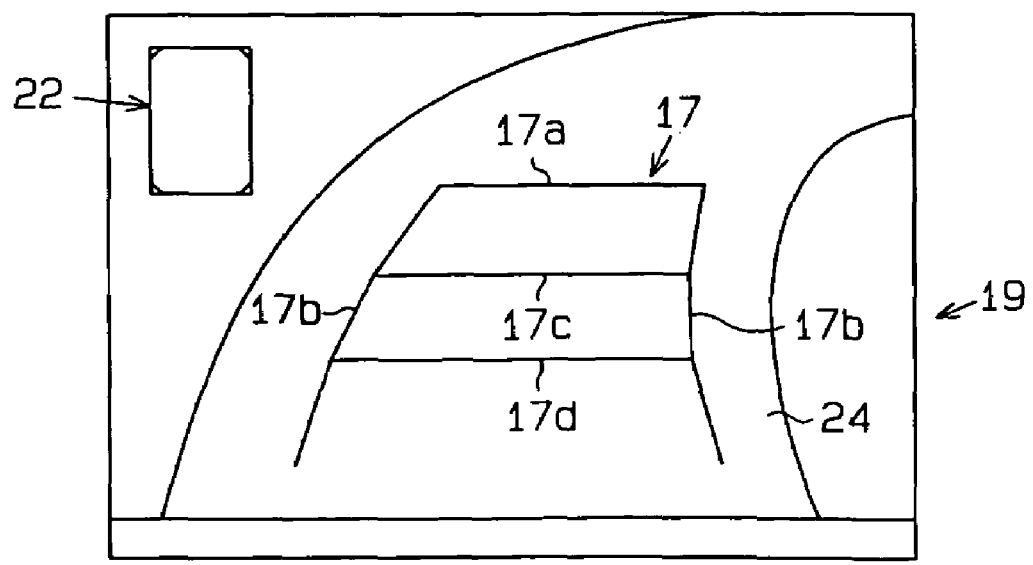
FIG. 9B is a diagram showing a state of the monitor screen when lateral lines of a guide frame are parallel to the lower sides of the monitor.

FIG. 9B shows the screen 19 when the lines 17a, 17c, 17d of the guide frame 17 are parallel. In this case, even if the curvature of the guide frame 17 is the same as that of the road 24, the curvatures appear different to the driver, which confuses the driver. Therefore, generating the lines 17a, 17c, 17d to extend between points on the same radius as in FIGS. 8 and 9A permits the frame 17 to appear natural to the driver.

Figure 10A:
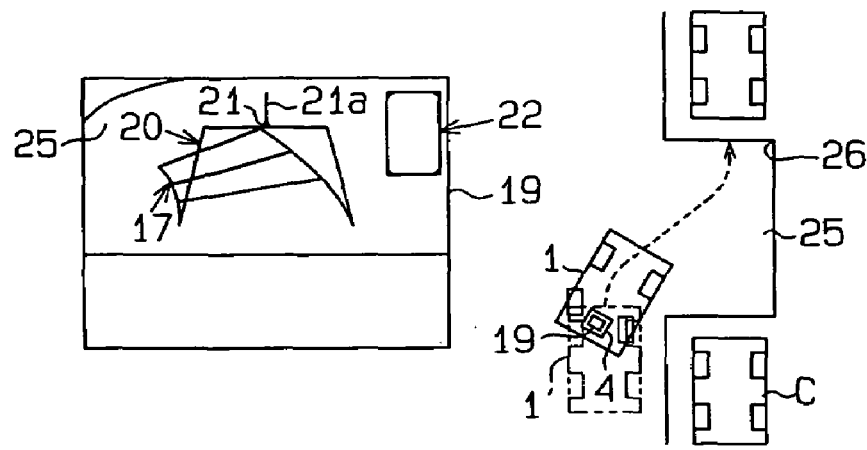
FIGS. 10A, 10B and 10C are diagrams showing the positions of a vehicle and the corresponding guidance marking on the monitor screen when the vehicle is being parallel parked.
Figure 10B:
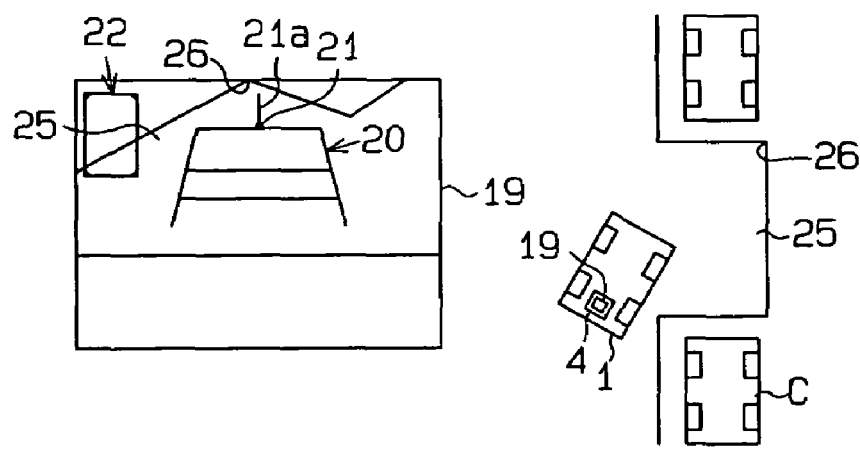
Figure 10C:
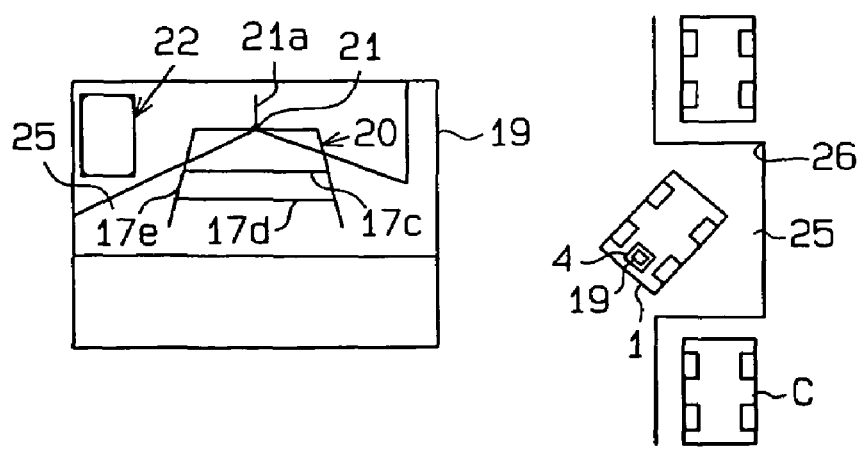
Figure 11A:
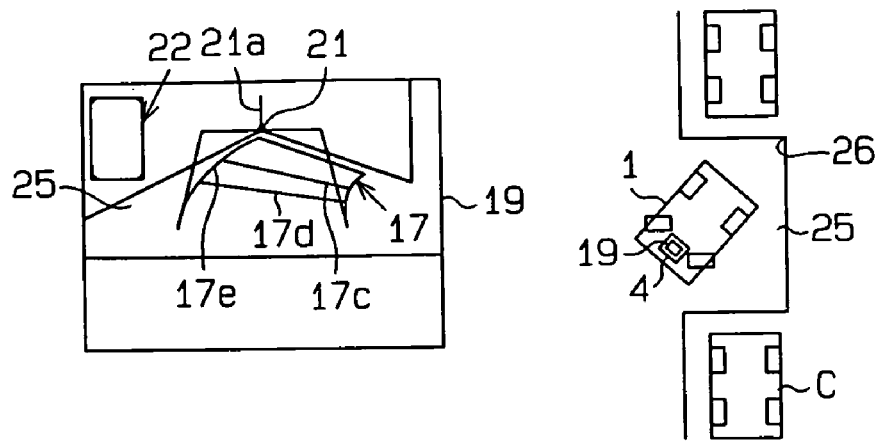
FIGS. 11A, 11B and 11C are diagrams showing the positions of vehicle and the corresponding guidance marking on the monitor screen when the vehicle is parallel parked.
Figure 11B:
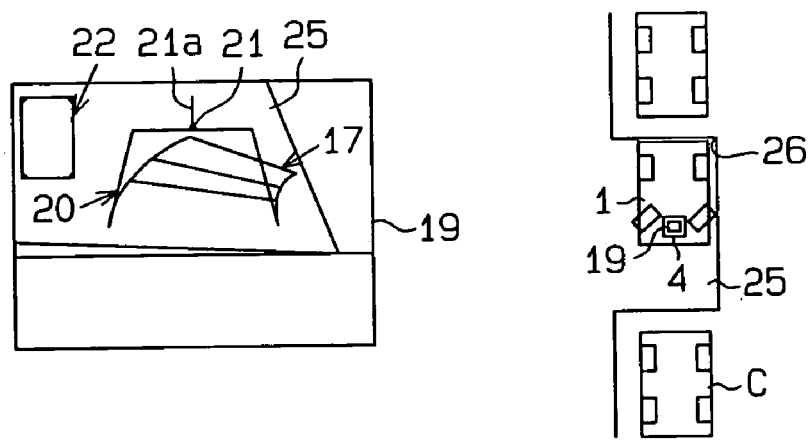
Figure 11C:
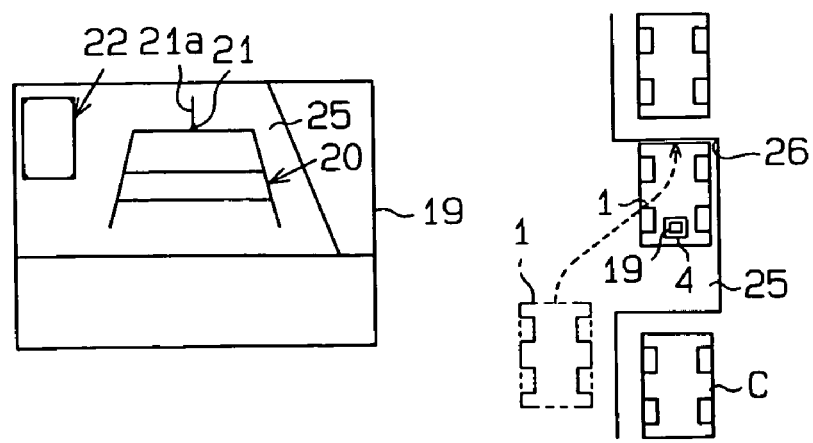

Parallel parking of the vehicle 1 using the steering assist apparatus 10 will now be described with reference to FIGS. 10A to 11C. The driver first shifts the shift lever 5 into reverse. Then, the driver makes sure that the space behind the vehicle 1 is clear. The driver also confirms that the vehicle 1 is separated from the rear of an adjacent vehicle C by approximately fifty centimeters. The driver starts backing the vehicle 1 with the screen 19 showing part of a parking space 25 as shown in FIG. 10A. The driver slowly backs the vehicle 1 while manipulating the steering wheel 8 such that the marker 21 matches a corner 26 of the parking space 25. When the marker 21 on the screen 19 matches the corner 26 as shown in FIG. 10C after the state of FIG. 10B, the driver turns the steering wheel 8 in the direction opposite to the steering direction of FIG. 10A. Accordingly, the wheels 7a are steered as shown in FIG. 11A. The driver backs the vehicle 1 until the corner 26 is out of the range of the screen 19 (FIG. 11B). When the side line 20a that is close to the curb becomes parallel to the curb, the driver puts the steering wheel 8 back to the straight position and stops the vehicle 1 (FIG. 11C). In this manner, the vehicle 1 is parallel parked.

The driver should make sure that segments 17e of the side lines 17b between the cross lines 17c and 17d are spaced apart from the curb. If the vehicle 1 is moved backward with the segments 17e overlapping the curb, the vehicle 1 will run onto the curb. Thus, if the segment 17e overlaps the curb, the driver will repeat the parking procedure.

If the parking space is relatively short and the starting point and the entry angle of the vehicle 1 are out of the appropriate range, the vehicle 1 may contact the vehicle C. Specifically, backing the vehicle with the steering wheel 8 maximally rotated after the marker 21 matches the corner 26 can cause a front corner of the vehicle 1 to collide with the vehicle C. In such a case, one of the obstacle sensors 6 detects the vehicle C before the vehicle 1 contacts the vehicle C and sends the first obstacle signal and the second obstacle signal to the CPU 14. The corner marker 23a is changed to a state corresponding to the first or second obstacle signals. This permits the driver to see that front left corner of the vehicle 1 will contact the vehicle C by looking only at the screen 19. If the corner marker 23a is in the state corresponding to the first obstacle signal, the driver continues moving the vehicle 1 backward. If the corner marker 23a is in the state corresponding to the second obstacle signal, the driver stops the vehicle 1 and looks back to judge whether the vehicle can be moved further backward without interfering with the vehicle C. Alternatively, the driver restarts the parking procedure after changing the entry angle.

Parking the vehicle 1 perpendicular to a reference line such as a curb and reversing the vehicle direction using the apparatus 10 will now be described with reference to FIGS. 12A to 12D. The driver first approaches a parking space 25. Then, looking at the monitor screen 19, the driver backs the vehicle 1 while manipulating the steering wheel 8 such that the lateral line 17a of the guide frame 17 matches the center of the parking space 25. When the vehicle 1 reaches the far end of the parking space 25, the driver stops the vehicle 1. In this manner, the vehicle 1 is parked perpendicular to the reference line. When the driver wishes to switch the vehicle direction, the driver shifts the shift lever 5 to the drive position and moves the vehicle forward.

Figure 12A:
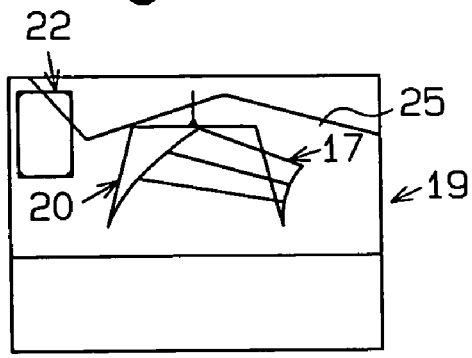
FIGS. 12A, 12B, 12C and 12D are diagrams showing the monitor screen when parking the vehicle perpendicular to a reference such as a curb.
Figure 12B:
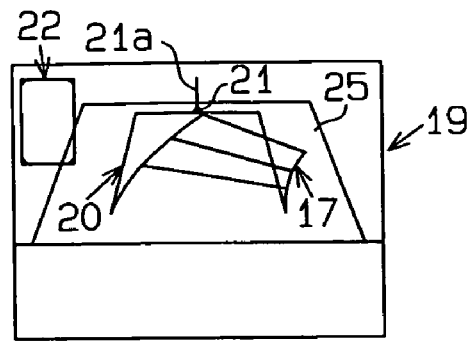
Figure 12C:
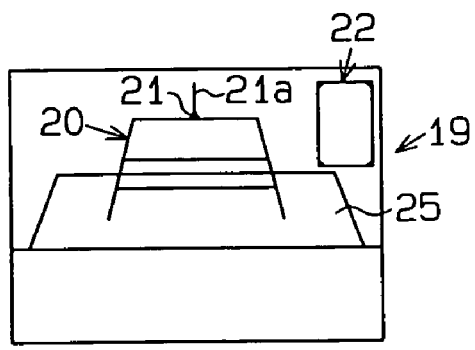
Figure 12D:
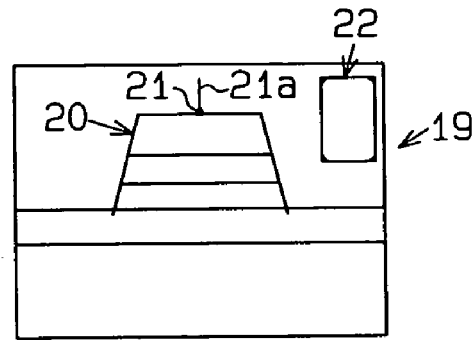

When parking the vehicle 1 perpendicular to a reference line, the driver may use the guide frame 17 and the fixed frame 20 or the line 21a of the marker 21. In this case, the driver approaches the parking space 25. Then, the driver manipulates the steering wheel 8 such that the guide frame 17 is located in the parking space 25 with a sufficient margin about it as shown in FIG. 12A. Keeping the position of the steering wheel 8, the driver starts backing the vehicle 1. When the side lines 20a of the fixed frame 20 are parallel to the parking space 25 or when the line 21a of the marker 21 is perpendicular to the rear end of the parking space 25 as shown in FIG. 12B, the driver turns the steering wheel 8 to the straight position as shown in FIG. 12C. Then, the driver moves the vehicle 1 to the far end of the parking space 25.

The above embodiment has the following advantages.

(1) The width of the guide frame 17 corresponds to the width of the vehicle 1. The guide frame 17 is at the reference position when the steered angle $\alpha$ is zero, or when the front wheels 7a are at the straight line position. When the steering means (steering wheel 8) is manipulated, the guide frame 17 is swung to left or to right in accordance with the angle $\alpha$. When moving the vehicle 1 backward in an S-shaped path or when parking the vehicle 1 perpendicular to a reference, the driver manipulates the steering wheel 8 such that the guide frame 17 is located in the center of the path, which permits the vehicle 1 to be easily moved to a desired location.

(2) The CPU 14 computes the steered angle $\alpha$ based on the detection signal of the angle sensor 9. The CPU 14 then computes the predicted path of the vehicle 1 with the angle $\alpha$ and superimposes the guide frame 17 on the image captured by the camera 2. Thus, data representing predetermined guide frames corresponding to various angles α need not be stored in a memory.

(3) The CPU 14 computes the predicted path of the vehicle 1 using polar coordinates. The guide frame 17 has lines 17a, 17c, 17d, each of which extends radially from the center of a turn. Thus, when the guide frame 17 is bent in accordance with the curvature of a road, the lines 17a, 17c, 17d appear natural compared to lines that are horizontal with respect to the screen 19.

(4) The guide frame 17 may be generated by converting the coordinates of a predicted path into polar coordinates without converting the circle of the predicted path into an ellipse as shown in FIG. 6. In this case, even if the wheel angle α is adjusted such that the curvature of the guide frame 17 matches the curvature of the road 24, the rear wheels 7b will gradually approach the inner curb and eventually run over the curb. However, in this embodiment, the CPU 14 converts the circle of the predicted path into an ellipse as shown in FIG. 6, which delays the time at which the driver manipulates the steering wheel 8. As a result, the rear wheels 7b do not run onto the inner curb.

(5) The guide frame 17 is displaced from the position accurately corresponding to the ellipse of FIG. 6 in the monitor screen 19. Compared to a case where the guide frame 17 is not displaced, the guide frame 17 is swung with less steering motion. As a result, the driver steers the wheels 7a by with less movement of the steering wheel 8, which prevents the rear wheels 7b from approaching the inner curb too closely.

(6) The circle of the predicted path is converted into an ellipse. The guide frame 17 is generated based on the ellipse. When shown on the screen 19, the guide frame 17 is displaced backward from the position accurately corresponding to the ellipse, which prevents the rear wheels 7b from approaching the inner curb too closely.

(7) The guide frame 17 includes a lateral line 17a and side lines 17b extending from the ends of the lateral line 17a to the rear end of the vehicle. The length of the lateral line 17a corresponds to the width of the vehicle 1. The lateral line 17a is separated from the vehicle by a distance substantially equal to the wheelbase L. This permits the driver to estimate the distance between the sides of the vehicle 1 and the curbs when moving the vehicle backward along an S-shaped road. That is, when the driver manipulates the steering wheel 8 by referring to the guide frame 17, the manipulation amount will be appropriate. The side lines 17b and the cross lines 17c, 17d connecting the side lines 17b permit the driver to estimate the distance between the vehicle 1 and the curbs.

(8) The marker 21 is fixed in the screen 19 of the monitor 4, which facilitates parallel parking of the vehicle 1.

(9) Two of the obstacle sensors 6 are located at the front corners of the vehicle 1. Based on signals from the sensors 6, the presence of an obstacle is displayed on the monitor screen 19. Thus, if the angle of entry is not proper when parallel parking the vehicle 1, the screen 19 warns the driver of an obstacle before the vehicle 1 contacts another vehicle. Accordingly, the driver can avoid contact with the vehicles.

Some existing vehicles have obstacle sensors at their body corners. These vehicles either produce warning sound or shows warning marking on the instrument panel to indicate an obstacle. However, the sound may be inaudible depending on the environment. Also, if the driver concentrates on the screen 19 of the monitor 4, he might fail to notice the marking on the instrumental panel. The present invention, however, shows the obstacle finder 22 on part of the screen 19, which immediately warns the driver when the vehicle is too close to an obstacle.

(10) The fixed frame 20 includes the vehicle side lines 20a and a lateral line 20b connecting the far ends of the side lines 20a. The marker 21 is located on the center of the line 20b and includes a line 21a extending vertically to the line 21a. The marker 21 permits the driver to see the direction of the vehicle 1. The fixed frame 20 permits the driver to compare the vehicle width and the width of a parking space. In other words, the marker 21 and the fixed frame 20 facilitate parallel parking.

(11) The fixed frame 20 and the guide frame 17 are displayed at the same time on the screen 19. Thus, when the driver switches the steering direction during parallel parking, the driver can easily judge when the front wheels 7a are at the straight position. Also, the driver can easily judge whether the vehicle will run onto a curb by seeing the distance between a curb and the center segment of the nearest side line 17b.

(12) The monitor 4 is not exclusively designed for the steering assist apparatus 10 but is also used as the monitor of a navigation system, which reduces the cost. The navigation system is not used when the vehicle is being moved backward. Therefore, using the same monitor for both purposes causes no problem.

(13) The image of the camera 2 is in black and white and the guide frame 17, the fixed frame 20 and the marker 21 are displayed in color. Compared to showing everything on the screen 19 in color, the present invention reduces the cost. Also, the black and white background gives the color guide frame 17 prominence. Further, the black and white image of the camera 2 reduces the amount of data processed by the CPU 14.

(14) The distance between the far end of the view of the camera 2 and the rear end of the vehicle 1 is longer than the length of the vehicle 1. Thus, the screen 19 shows the road beyond the guide frame 17. Therefore, when backing the vehicle 1 in an S-shaped path, the driver manipulates the steering wheel 8 such that the guide frame 17 is located at the center of the road, which gives the driver the feeling that the vehicle 1 is backing to the desired location.

A second embodiment will now be described with reference to FIGS. 14 to 17. The second embodiment is different from the first embodiment in the method for computing the predicted path of the vehicle 1. Specifically, in the second embodiment, the predicted path is computed based on the manipulation state (manipulation tendency) of the steering wheel 8. That is, the path is computed based on the speed of manipulation (steering speed).

As described in the first embodiment, manipulating the steering wheel 8 such that the guide frame 17 is located in the center of the road permits the vehicle 1 to back along a desired path. However, manipulation of the steering wheel 8 to locate the guide frame 17 at the center of the road varies from one driver to another. For example, one driver may rotate the steering wheel 8 at a different steering speed from another driver. The apparatus according to the second embodiment takes the tendency of each driver into account.

Figure 15:
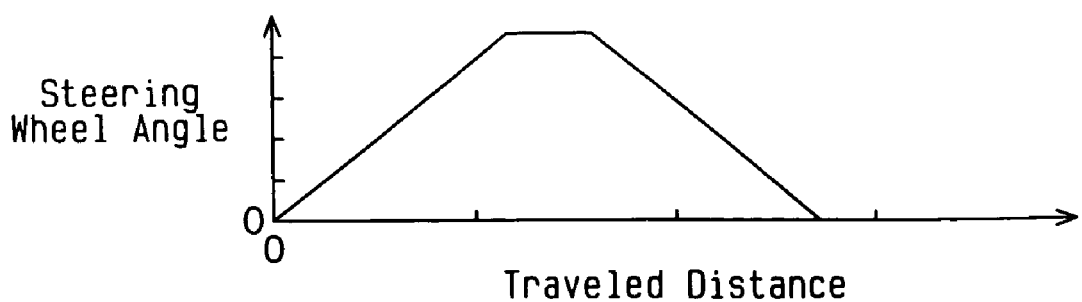
FIG. 15 is a graph showing changes of the angle of wheels when the vehicle is moving along a corner.
Figure 16:
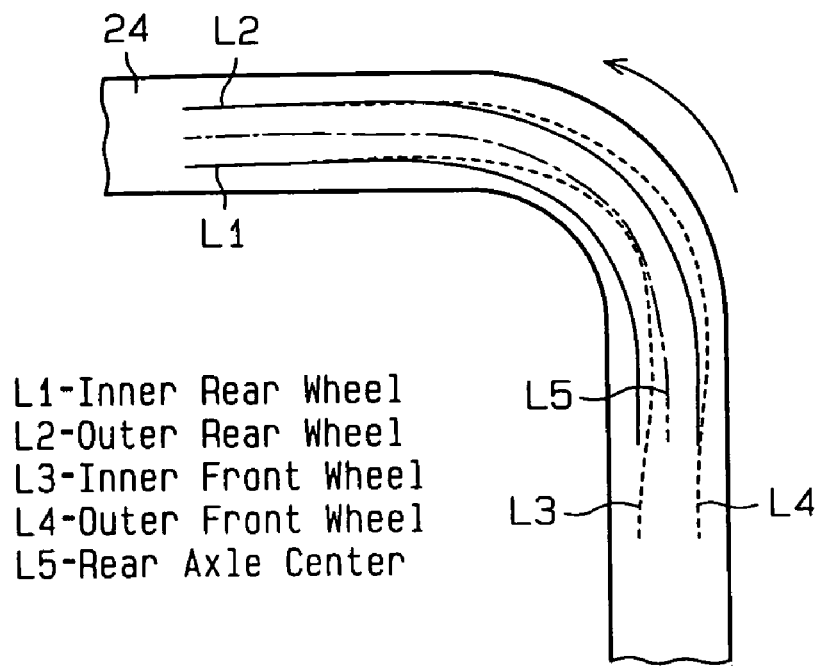
FIG. 16 is a diagram showing the paths taken by wheels of a vehicle when the vehicle is moving along a corner.

In general, when a vehicle moves along a corner of a road, the steering speed changes as shown in FIG. 15. That is, at the entry of the corner, the steered angle of a steering wheel is zero. As the vehicle moves along the corner, the steering wheel angle gradually is increased until it is maintained at a certain angle. Then, the steering wheel angle is gradually decreased toward the exit of the corner. At the exit, the steering wheel angle returns to zero. In other words, the angle of the vehicle wheels is gradually increased until it corresponds to the curvature of the curve. The angle of the wheels is maintained for a certain time (certain distance). Then, the angle of the wheels must be gradually decreased. FIG. 15 shows the relationship between the rotation angle of a steering wheel and the distance traveled by the vehicle. When a vehicle is moved along the corner of FIG. 16 by manipulating the steering wheel as in FIG. 15, the vehicle wheels and the axial center of the rear axle are moved along paths shown in FIG. 16. Line L1 shows the path of the inner rear wheel. Line L2 shows the path of the outer rear wheel. Line L3 shows the path of the inner front wheel. Line L4 shows the path of the outer front wheel. Line L5 shows the path of the axial center of the rear axle.

When the vehicle is moved through a curve having a constant radius, the steering angle is maintained for a certain time and is changed according to the time (distance). This is true not only for a right angle corner but also for an S-shaped road or for a U-shaped road.

If the vehicle is moved with the steering wheel turned at a fixed position, the path of the vehicle is substantially circular. The circle is easily computed based on the angle of the vehicle wheels, which corresponds to the rotation angle of the steering wheel (steering angle), and vehicle measurements such as the wheelbase. If the steering wheel is rotated at a constant speed, the path of the vehicle will be inside of the circle drawn by a vehicle with the steering wheel fixed at a certain angle.

Figure 17:
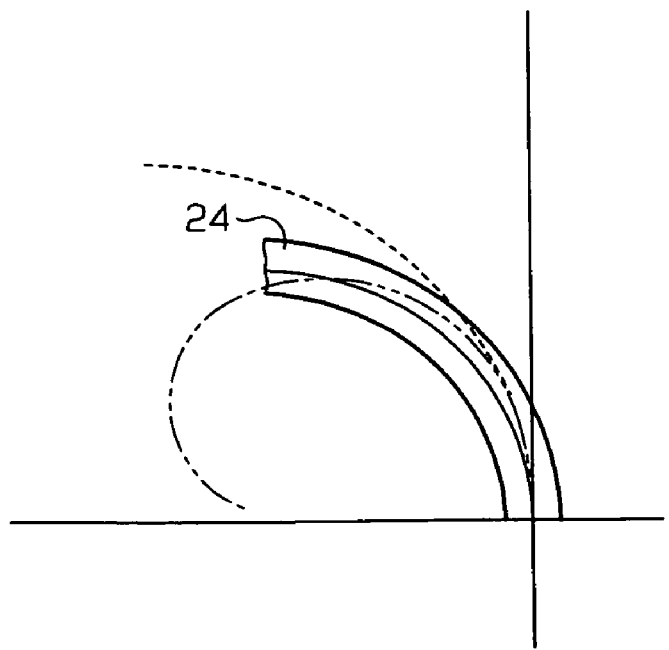
FIG. 17 is a diagram showing the relationship between the state of a steering wheel and the path of the vehicle.

In an apparatus that shows a guidance marking such as the guide frame 17, on a monitor for assisting steering, the location of the guidance marking on the monitor is determined in accordance with the current steering wheel angle. Specifically, the path of the vehicle is predicted based on the current steering wheel angle, and the guidance marking is generated based on the predicted path. FIG. 17 shows a road 24 and a representation of the location of the guidance marking as seen by the driver. The guidance marking is the predicted path of the vehicle. The driver manipulates the steering wheel such that the guidance marking is aligned with the center of the road.

When the driver starts rotating the steering wheel, the guidance marking does not match the road 24. Specifically, the curvature of the guidance marking is less than that of the road 24 as shown by the uniformly dashed line of FIG. 17. This may cause the driver to oversteer to match the guidance marking with the road 24. The driver would have difficulty moving the vehicle along the road 24.

When backing the vehicle, the driver first rotates the steering wheel by a small amount and observes the guidance marking on the monitor screen. At this time, the driver feels a need to rotate the steering wheel more. Eventually, the guidance marking is shifted from the position of the uniformly dashed line to that of the solid line, which extends along the center of the road (see FIG. 17). However, in this case, the driver rotates the steering wheel relatively quickly. As a result, the vehicle wheels are oversteered and the vehicle runs onto the inner curb of the road 24 as shown by the long and short dashed broken line of FIG. 17.

The guidance marking position represented by the uniformly dashed line almost matches the actual vehicle path (which is represented by the long and short dashed line) in the vicinity of the vehicle. In this case, whether the guidance marking continues to be valid is determined by the steering speed of the steering wheel 8. That is, if the driver steers the steering wheel quickly, the vehicle is more likely to approach the inner side of the road than if the steering speed is slow. Thus, the guidance marking is preferably closer to the inner side of the road. This causes the driver to slow down the steering speed or to rotate the steering wheel in the opposite direction.

The second embodiment is different from the first embodiment in that the apparatus according to the second embodiment adjusts the predicted path according to the manipulation state of the steering wheel 8. Specifically, part of the control program stored in the program memory 15*a* in FIG. 1 and some of the operations executed by the CPU 14 are different from those of the first embodiment. Like or the same reference numerals are given to those components that are like or the same as the corresponding components of the first embodiment. The program memory 15*a* stores a program represented by the flowchart of FIG. 14.

The CPU 14 receives the angle $\alpha$ of the front wheels 7*a* at predetermined intervals. The CPU 14 stores the current angle $\alpha$ and the previous angle $\alpha$ in the predetermined area in the working memory 15*b*. Every time a new angle $\alpha$ is received, the CPU 14 renews the angle data. The CPU 14 then computes the pivoting speed of the front wheels 7*a* based on the difference between the previous angle $\alpha b$ and the current angle $\alpha a$. The CPU 14 multiplies the steering speed with a predetermined coefficient thereby obtaining a correction value and adds the correction value to the angle $\alpha$. The resultant is defined as a provisional current wheel angle $\beta$. The CPU 14 predicts the path of the vehicle 1 based on the provisional angle $\beta$. The predetermined coefficient is previously computed through experiments and stored in the program memory 15*a*.

The procedure for generating data representing the guide frame 17 will now be described. When receiving a signal indicating that the shift lever 5 is in reverse, the CPU 14 generates data representing the guide frame 17 in accordance with the flowchart of FIG. 14 at predetermined intervals (for example, thirty-three milliseconds).

At step S10, the CPU 14 reads the wheel angle $\alpha$ from the controller 12 and renews the wheel angle data stored in the working memory 15*b*. At step S11, the CPU 14 judges whether there are two sets of wheel angle data, or a set representing the angle $\alpha a$ and a set representing the angle $\alpha b$, from two cycles of the routine. If the determination is positive, the CPU 14 moves to step S12. If the determination is negative, the CPU 14 moves back to step S10. At step S12, the CPU 14 computes the steering speed based on the difference between the current wheel angle $\alpha a$ and the previous wheel angle $\alpha b$ and moves to step S13. At step S13, the CPU 14 computes the predicted path in accordance with the steering speed.

At step S13, the CPU 14 multiplies the steering speed with a predetermined coefficient thereby obtaining a correction value and adds the correction value to the current wheel angle $\alpha$. The resultant is defined as a provisional current wheel angle $\beta$. Then, the CPU 14 adjusts the predicted path based on the equations (3) to (5) of the first embodiment. If the steering speed is not zero, the provisional wheel angle $\beta$ is greater than the current wheel angle $\alpha$, and the radiuses Rc, Ro, Ri become shorter than the radiuses of the current predicted circle. When the steering speed is zero, the provisional wheel speed $\beta$ matches the current wheel angle $\alpha$ and the predicted path circles match those of FIG. 6.

At step S14, the CPU 14 determines the coordinates of the ends of each line 17*a*, 17*c*, 17*d*. At step S15, the CPU 14 converts the coordinates of the lines 17*a*, 17*c*, 17*d* into polar coordinates. At step S16, the CPU 14 generates data for superimposing the guide frame 17 on the image of the camera 2 and sends the data to the monitor controller 13. The monitor controller 13 superimposes the guide frame 17 on the image on the monitor screen 19.

In addition to the advantages (1) to (3) and (7) to (14) of the first embodiment, the second embodiment has the following advantages.

(15) The predicted path is adjusted according to the current steering speed. Therefore, the guide frame 17 is displayed at a proper location on the screen 19 regardless whether the steering wheel 8 is being rotated.

(16) When computing the predicted path in consideration of the steering speed the steering speed is multiplied by a predetermined coefficient and is added to the current wheel angle $\alpha$. The resultant is defined as a provisional current wheel angle $\beta$. The predicted path is adjusted based on the angle $\beta$. Therefore, if the position of the steering wheel 8 is not being changed, the provisional current angle $\beta$ is the same as the current angle $\alpha$ and the predicted path is the same as that computed in the first embodiment. Thus, even if the steering wheel 8 is not being rotated, the apparatus properly assists the steering.

(17) The steering speed is computed based on the difference between the wheel angles of two cycles of the routine, which is executed at predetermined intervals. This eliminates the necessity for a sensor for detecting the steering speed.

(18) The correction value of the wheel angle is computed by multiplying the steering speed with a predetermined coefficient. The coefficient is previously obtained through tests. Therefore, computation of the coefficient is easy.

A third embodiment will now be described. The third embodiment is different from the second embodiment in that the predicted path is computed based not only on the steering speed but also on the vehicle speed.

In general, a vehicle is backed at a substantially constant speed. Thus, in the first and second embodiments, coefficients for adjusting the predicted path are previously computed through tests assuming that the vehicle 1 is moved backward at a constant speed. However, if the driver changes the vehicle speed to a value greatly different from the assumed value, the guide frame 17 is not displayed at the proper location on the screen 19.

Also, if the vehicle speed is changed while the front wheels are being steered at a constant speed, the path of the vehicle is different from that when the vehicle speed is constant. For example, if the vehicle speed is increased, the curvature of the path is decreased. If the vehicle speed is decreased, the curvature is increased.

In the first and second embodiments, the predicted path is corrected without considering vehicle speed changes. Thus, if the steering speed is constant, the correction amount is constant. The guide frame 17 is not changed even if the vehicle speed is increased. Therefore, the vehicle 1 is gradually displaced outward as it moves backward. The third embodiment eliminates such a drawback.

A steering assist apparatus 10 includes a vehicle speed sensor in addition to the members of the first and second embodiments. The third embodiment differs from the second embodiment in the control programs stored in the program memory 15*a* and in the operation executed by the CPU 14. The program memory 15*a* stores a program represented by the flowchart of FIG. 18. Like or the same reference numerals are given to those components that are like or the same as the corresponding components of the second embodiment.

Figure 18:
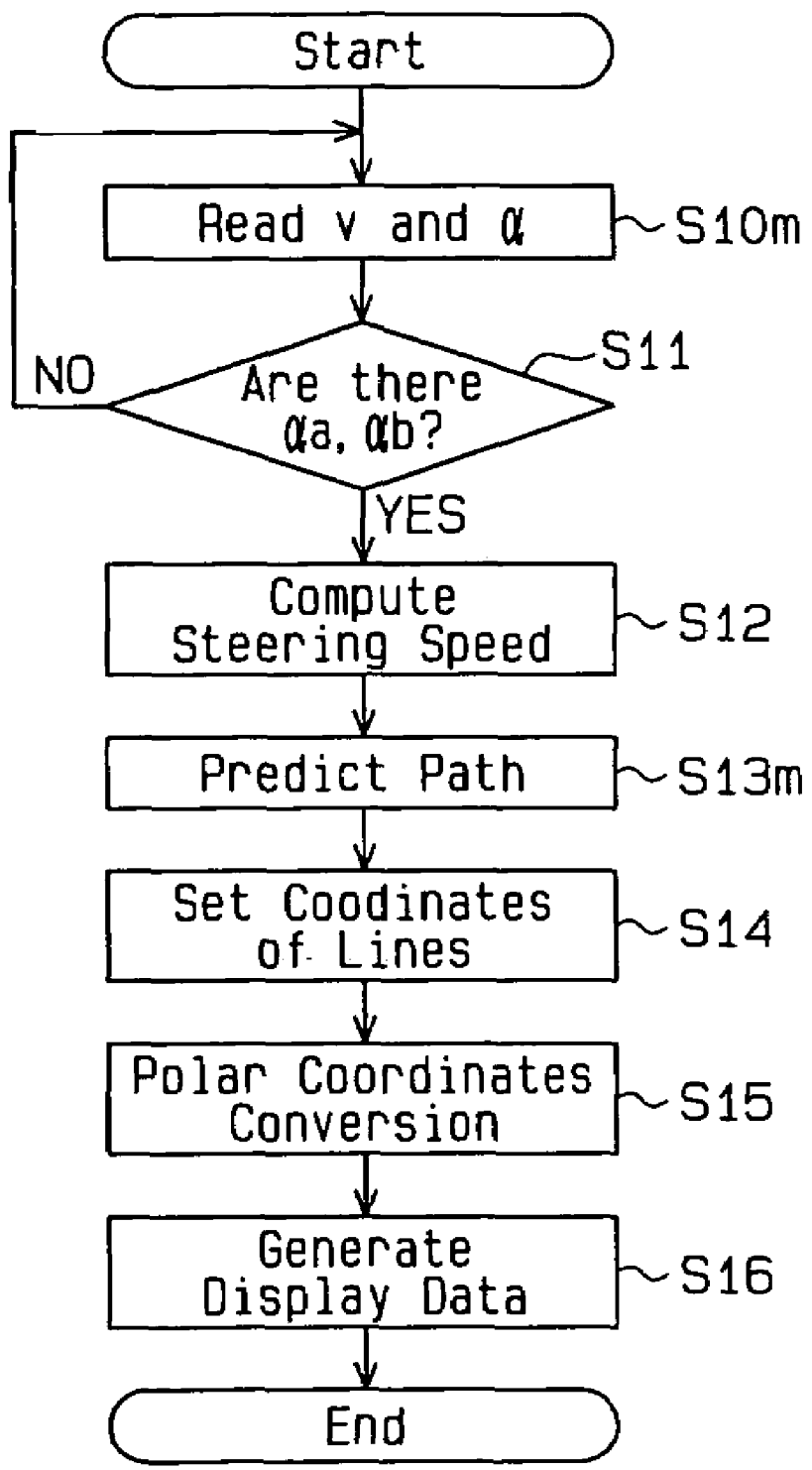
FIG. 18 is a flowchart showing a routine according to a third embodiment.

A procedure for generating data representing the guide frame 17 will now be described. The flowchart of FIG. 18 is the same as the flowchart of FIG. 14 except for some steps. Specifically, step S10*m* for reading data and step S13*m* for computing the predicted path are different from the corresponding steps S10, S13 of the flowchart of FIG. 14.

In step S10*m*, the CPU 14 reads a signal of the wheel angle $\alpha$ from the controller 12 and renews the wheel angle data stored in the working memory 15*b*. The CPU 14 also reads vehicle speed data v. At step S11, the CPU 14 judges whether two sets of wheel angle data $\alpha$a and $\alpha$b of two respective cycles are stored in the working memory 15*b*. If the determination is positive the CPU 14 moves to step S12. If the determination is negative the CPU 14 returns to step S10*m*. At step S12, the CPU 14 computes the steering speed $V\theta$ based on the difference between the current wheel angle $\alpha$a and the previous wheel angle $\alpha$b and moves to step S13*m*. At step S13*m*, the CPU 14 adjusts the predicted path.

At step S13*m*, the CPU 14 computes a steering amount C per unit distance traveled by the vehicle 1 based on the steering speed $V\theta$ and the vehicle speed v using the following equation.

$$C=V\theta/v$$

The CPU 14 then multiplies the value C with a predetermined coefficient and adds the value to the current wheel angle. The CPU 14 defines the resultant as a provisional wheel angle $\beta$. Using the value $\beta$, the CPU 14 adjusts the predicted path based on the equations (3) to (5) of the first embodiment. The predetermined coefficient is previously obtained through tests and is stored in the program memory 15*a*.

The correction value, which is added to the current wheel angle, is changed in accordance with the steering speed $V\theta$. If the steering speed $V\theta$ is zero, that is, if the steering wheel 8 is not being rotated, the correction value is also zero. In this case, the provisional current wheel angle $\beta$ is the same as the current wheel angle. The predicted path circle is the same as those of the previous embodiments.

As in the second embodiment, the CPU 14 executes steps S14, S15 and S16. Accordingly, the monitor controller 13 superimposes the guide frame 17 on the image of the view from the rear of the vehicle on the screen 19 of the monitor 4.

The third embodiment has the same advantages as the second embodiment except the advantage (18). Further, the third embodiment has the following advantages.

(19) The predicted path is corrected in accordance not only with the current steering speed $V\theta$ but also with the vehicle speed v. Therefore, the guide frame 17 is displayed at a proper location regardless whether the steering wheel 8 is being rotated. Even if the vehicle speed v is changed, the guide frame 17 is properly adjusted.

(20) The correction value is obtained by multiplying the steering amount C per unit distance traveled by the vehicle with the predetermined coefficient. The coefficient is previously obtained through tests. The coefficient is therefore easily and accurately obtained.

Figure 19:
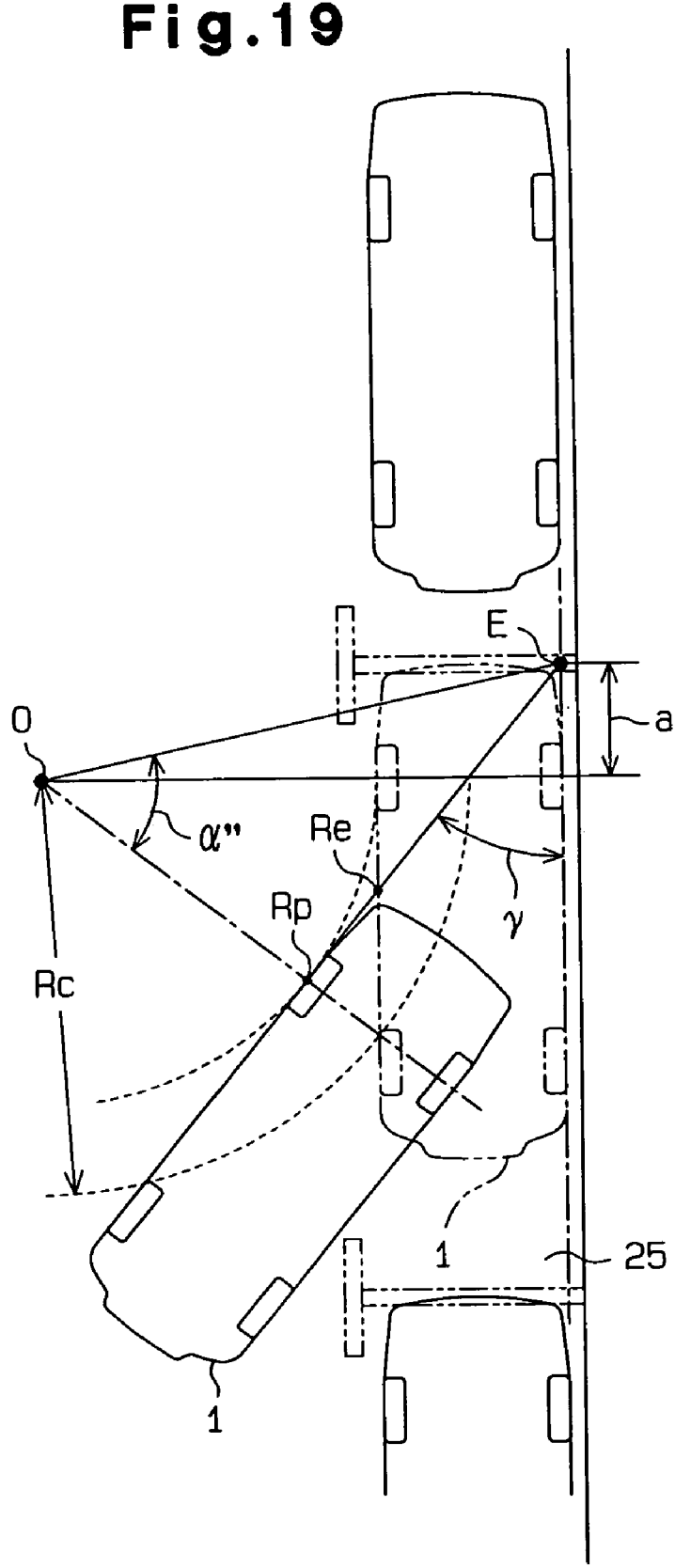
FIG. 19 is a diagram for calculating the location of a marker on the monitor screen according to a fourth embodiment.

A fourth embodiment of the present invention will now be described with reference to FIGS. 19 and 20. The fourth embodiment is the same as the first embodiment except for markers used in parallel parking. Like or the same reference numerals are given to those components that are like or the same as the corresponding components of the first embodiment.

As shown in FIGS. 20A to 20C, the apparatus of the fourth embodiment has two markers 27*a*, 27*b* for parallel parking. The marker 27*a* is used when parallel parking a vehicle to a parking space located to the left and behind the vehicle. The marker 27*b* is used when parallel parking a vehicle to a parking space located to the right and behind the vehicle. The marker 27a is located on a line extended from the right side of the vehicle 1. The marker 27a is separated from the rear end of the vehicle 1 (the rear bumper 3) by a predetermined distance. The marker 27b is located on a line extended from the left side of the vehicle 1. The marker 27b is separated from the rear end of the vehicle 1 (the rear bumper 3) by a predetermined distance. Auxiliary lines 28 extend rearward from the markers 27a, 27b. The auxiliary lines 28 extend from the side lines of the vehicle 1 and are aligned with side lines 29, which extend between the markers 27a, 27b and the bumper 3. When a parking space is located behind and to the left of the vehicle 1, the marker 27a is used. When a parking space is located behind and to the right of the vehicle 1, the marker 27b is used.

The procedure for determining the location of the marker 27a will now be described. In FIG. 19, a target location of the vehicle 1 is illustrated by dotted lines. A corner that corresponds to the rear left corner of the target vehicle location is defined as a point E. A distance a between the point E and the rear axle is the rear overhang of the vehicle 1. When the vehicle 1 is moved with the steering wheel 8 fully rotated, the intersection point of the line including the rear axle and the right side line of the vehicle is moved along a circle of a radius (Rc−W/2), in which W is the width of the vehicle 1. When the tangent of the circle includes the point E, the intersection point is defined as a point Rp. The angle defined by the tangent, which includes the point Rp and the point E, and a line parallel to the curb including the point E is defined as an angle γ. The angle γ is a preferred angle at which the vehicle 1 should enter the parking space. An angle defined by the line extending between the point E and the center O of the turning and the line extending between the point Rp and the center O is defined as an angle α". The following equations are satisfied. A distance between the center O and the axial center of the rear axle is defined as a distance Rc.

$$\overline{OE} = \sqrt{\{(Rc+W/2)^2 + a^2\}}$$

$$\cos \alpha'' = \overline{ORp}/\overline{OE}$$

$$= (Rc-W/2)/\sqrt{\{(Rc+W/2)^2 + a^2\}}$$

$$\therefore \alpha'' = \cos^{-1}(Rc-W/2)/\sqrt{\{(RC+W/2)^2 + a^2\}}$$

$$\therefore \overline{RpE} = \overline{ORp} \tan \alpha'' = (Rc-W/2)\tan \alpha''$$

Thus, the distance DA between the point E and a point Re, which is separated from the point Rp by the distance a of the vehicle overhang satisfies the following equation.

$$DA = (Rc-W/2)\tan \alpha'' - a \quad (7)$$

The location of the marker 27a when the entry angle is the angle γ is obtained based on the equation (7). The distance DA is adjusted through experiments in consideration of a case where the angle of approach is greater than the angle γ.

When parallel parking the vehicle 1 in a parking space located behind and to the right of the vehicle 1, the marker 27b is used. A corner of the parking space corresponding to the rear right corner of the vehicle 1 is determined as the point E. Then, the location of the marker 27b is computed in the same manner as the procedure for computing the marker 27a.

Next, a procedure for parallel parking the vehicle by using the marker 27a in a parking place located behind and to the left of the vehicle 1 will be described. When the driver shifts the shift lever 5 to the reverse position, the screen 19 displays part of a parking space 25. The driver slowly backs the vehicle 1. At this time, the driver rotates the steering wheel 8 such that the auxiliary line 28 corresponding to the marker 27a matches the target point of the parking space 25, or with the corner 26, as in FIG. 20B. When the corner 26 matches the auxiliary line 28, the driver returns the steering wheel 8 to the straight position and continues slowly backing the vehicle 1. When the marker 27a matches the corner 26 as shown in FIG. 20C, the driver switches the steering direction of the steering wheel 8 and rotates the steering wheel 8 all the way to the limit. In this state, the driver backs the vehicle 1 until the corner 26 is out of the view of the screen 19. When the side lines 29 are parallel to the curb, the driver returns the steering wheel 8 to the straight position and stops the vehicle 1. The parallel parking is completed in this manner.

When parallel parking the vehicle 1 in a parking space located behind and to right of the vehicle 1, the above procedure is performed by using the marker 27b.

Compared to the case where the marker 21 of the first embodiment is used, the fourth embodiment has the following advantages.

(21) Compared to a case where the marker 21 is located to apparently intersect the longitudinal axis of the vehicle 1, the angle γ of entry is greater when parallel parking the vehicle 1. That is, the angle γ defined by the entry direction of the vehicle 1 and the curb is greater, which facilitates the parallel parking.

(22) Compared to a case where the marker 21 is located to apparently intersect the longitudinal axis of the vehicle 1, the vehicle 1 can be moved backward by a greater distance with the steering wheel 8 at fully rotated position. Thus, the driver can take his eyes from the monitor 4 to look about for a relatively long time.

Figure 22:
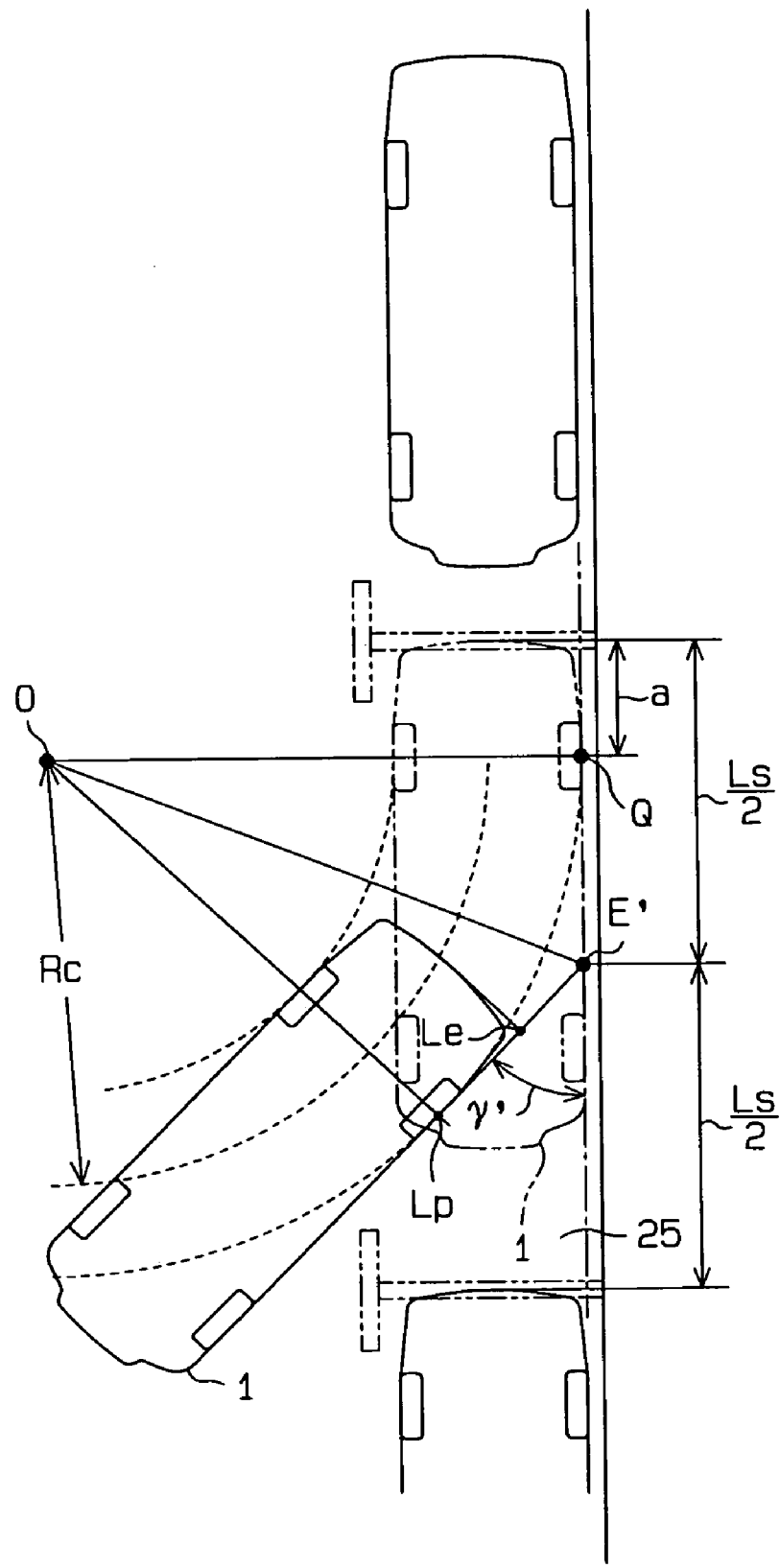
FIG. 22 is a diagram for calculating the location of markers on the monitor screen.

A fifth embodiment of the present invention will now be described with reference to FIGS. 21 and 22. Unlike the fourth embodiment, the target point for parallel parking is not the corner 26 of the parking space but is the center point the curb of the parking space. A marker is matched with the center point when parallel parking. The locations of the markers 27a and 27b are opposite of those of the fourth embodiment. That is, the marker 27a is located on a line extended from the left side of the vehicle 1 and is separated from the vehicle rear end (the rear bumper 3) by a predetermined distance. The marker 27b is located on a line extended from the right side line of the vehicle 1 and is separated from the vehicle rear end (the rear bumper 3) by a predetermined distance.

The marker 27a is used when parallel parking the vehicle 1 in a parking space located behind and to the left of the vehicle 1. The procedure for determining the location of the marker 27a will now be described. As shown in FIG. 22, a center point in the longitudinal direction of the parking space is defined as a point E'. The position of the vehicle 1 when it is parallel parked is shown in dotted lines. If the vehicle 1 is moved from the position of the dotted lines with the steering wheel 8 is fully rotated, the intersection of the line extended from the rear axle and the left side line of the vehicle 1 defines a circle, the radius of which is (Rc+W/2). When the tangent of the circle includes the point E', the intersection point is defined as a point Lp. The angle defined by the tangent, which includes the point Lp and the point E', and a line parallel to the curb including the point E' is defined as an angle γ '. The angle γ ' is the angle of entry of the vehicle 1.

A triangle including the point E', the center O and the point Lp is a right triangle. The intersection point of the side line of the vehicle 1 including the point E' and a line including the center O and the rear axle of the vehicle 1 at the position shown in dotted lines is defined as a point Q. The triangle including the point E', the center O and the point Q is also a right triangle. Since the length of the line OQ is the same as the length of the line OLp, the triangle of the points E', O and Lp is a mirror image of the triangle of the points E', O and Q. Thus, the length of the line LpE' is the same as the length of the line E'Q. The length of the parking space is Ls. Half of the line Ls, or the line Ls/2, is equal to the sum of the line E'Q and the overhang a. The distance between the point Lp and a point Le, which is separated from the point Lp by the overhang a, is defined as a distance DA'. The distance DA' is equal to (Ls/2−2a).

The markers 27a, 27b are used in the same manner as the fourth embodiment when the driver parallel parks the vehicle 1 except that the markers 27a, 27b are matched with the center of the parking space, not with the corner of the parking space. The driver matches the auxiliary line 28 and the marker 27a, 27b with a center of the parking space, which is marked, for example, by a tile located at the center of the parking space.

In the fifth embodiment, the angle of entry γ' is greater than the angle of entry of the fourth embodiment. In other words, even if the angle of the vehicle 1 to the curb of parking space is relatively great, the vehicle 1 is easily parallel parked.

A sixth embodiment will now be described with reference to FIGS. 23A, 23B, 23A and 24B. The sixth embodiment is the same as the fourth and fifth embodiment except for that the markers 27a, 27b are not extension the side lines of the vehicle 1 but are parallel to the side lines 29. That is, the auxiliary lines 28 of the markers 27a, 27b are parallel to but not aligned with the side lines 29. The locations of the markers 27a, 27b are changed in accordance with the target point, the proper angle of entry and with the displacement amount of the auxiliary lines 28.

For example, if the target point E is a corner of the parking space closer to the curb as shown in FIG. 23A and the auxiliary line 28 is located outside of the side line 29 by a certain amount, the location of the marker 27a is computed in the following procedure. The intersection point of the line that is parallel to and separated from the side line of the vehicle and the line including the rear axle is defined as a point P. When the line includes the point E, the angle defined by the line that includes the points P, E and the line that includes the point E and is parallel to the curb is defined as an angle γ" of entry. A point that is separated from the point P by a distance corresponding to the overhang a is defined as a point Pe. The following equations are satisfied.

$$\overline{PE}^2 = \overline{OE}^2 - \overline{OP}^2$$

$$\overline{OE} = (Rc + W/2)^2 + a^2$$

$$\overline{OP} = (Rc - W/2) - S$$

$$\therefore \overline{PeE} = \overline{PE} - \overline{PPe}$$

$$= \sqrt{\{(Rc + W/2)^2 + a^2 - (Rc - W/2 - S)^2\}} - a$$

The location of the marker 27a on the screen 19 is separated from the bumper 3 by a distance corresponding to the length of the line PeE.

FIG. 23B shows a case where a corner corresponding to the rear right corner of the parked position of the vehicle 1 is defined as a target point E". The auxiliary line 28 is spaced from the side of the vehicle by a certain distance S'. The marker 27a is computed in the following manner. An intersection point of the axis of the rear axle and a line parallel to the side of the vehicle 1 and separated from the side of the vehicle 1 by the distance S' is defined as a point P. The angle of entry of the vehicle 1 is defined as γ'". A point separated from the point P by a distance corresponding to the overhang a is defined as a point Pe. The angle of entry γ'" is greater than the angle γ" shown in FIG. 23A. The following equations are satisfied.

$$\overline{PE} = \overline{OE}^2 - \overline{OP}^2$$

$$\overline{OE}^2 = (Rc - W/2)^2 + a^2$$

$$\overline{OP} = (Rc - W/2) - S'$$

$$\therefore \overline{PeE} = \overline{PE} - \overline{PPe}$$

$$= \sqrt{\{(Rc - W/2)^2 + a^2 - (Rc - W/2 - S')^2\}} - a$$

Figure 24A:
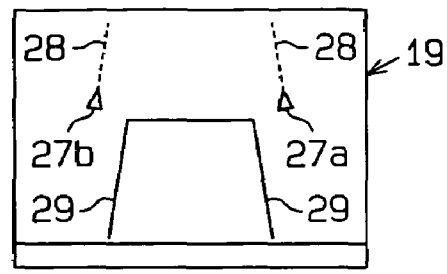
FIGS. 24A and 24B are diagrams showing the locations of markers on a monitor screen.
Figure 24B:
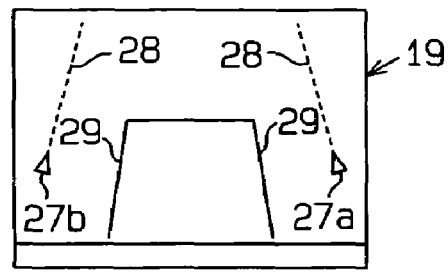

As shown in FIG. 24B, the location of the marker 27a on the screen 19 is separated from the rear bumper 3 by the length of the line PeE" and is separated from the line 29 by the distance of S'.

The markers 27a, 27b are used in substantially the same manner as in the fourth and fifth embodiments. The difference is that the target point is varied in the embodiment of FIGS. 23A and 24B.

That is, the locations of the markers 27a, 27b are determined based on the target point and the angle of entry of the vehicle 1 during parallel parking. Depending on the location of the markers 27a, 27b, the driver fully rotates the steering wheel 8 at different times.

It should be apparent to those skilled in the art that the present invention may be embodied in many other specific forms without departing from the spirit or scope of the invention. Particularly, it should be understood that the invention may be embodied in the following forms.

In the fourth to sixth embodiments, two markers 27a, 27b are used. Specifically, the marker 27a is used when parallel parking the vehicle 1 in a parking space located behind and to the left of the vehicle 1. The marker 27b is used when parallel parking the vehicle 1 in a parking space located behind and to the right of the vehicle 1. In these embodiments, an input means, or a switch, for signaling the location of the parallel parking space may be added to the apparatus 10. In accordance with the state of the switch, one of the markers 27a and 27b is selectively shown on the screen 19. This facilitates parallel parking compared to a case where two markers 27a, 27b are displayed on the screen simultaneously. Instead of showing just one of the markers 27a and 27b, the marker 27a, 27b being used may blink. This also facilitates parallel parking compared to a case where two markers 27a, 27b are displayed in the same way.

The guide frame 17 on the screen 19 permits the driver to judge the relationship between the width of the vehicle 1 and the width of the road. The data representing the guide frame 17 are generated based on the wheel angle α. Specifically, the CPU 14 computes the circle of a predicted path of the vehicle based on the wheel angle α and converts the coordinates of the circle into polar coordinates. Then, the CPU 14 converts the circle of the predicted path into an ellipse. When displaying the ellipse on the screen 19, the CPU 14 displaces the ellipse rearward from the accurate location. Instead, the relationship between the location of the guide frame 17 and the angle α may be previously obtained through experiments and stored in the program memory 15a. In this case, the CPU 14 selects a data of the location of the guide frame 17 that corresponds to the current angle α. This eliminates the necessity for computing the data representing the guide frame 17 thereby reducing the load on the CPU 14. Accordingly, the guide frame 17 is quickly displayed on the screen 19.

The side lines 17*b* and the cross lines 17*c*, 17*d* may be omitted from the guide frame 17 such that the guide frame 17 only has the line 17*a*. This facilitates the processing of data for generating the guide frame 17. As long as the relationship between the vehicle width and the width of a road is displayed on the screen 19, any type of display may be used. For example two dots corresponding to the ends of the line 17*a* or a guide frame representing the vehicle outline may be used.

In the illustrated embodiments, the length of the line 17*a* on the screen 19 corresponds to the width of the vehicle 1. However, the length of the line 17*a* may be longer. This makes it easier for the driver to keep rear wheels 7*b* on the road.

Regarding the first embodiment, the compression ratio of the predicted path circle and the amount of rearward displacement of the guide frame 17 may be varied in accordance with the vehicle speed. For example, vehicle backing speed may be divided into two or more speed zones and the proper compression ratio and the displacement amount can be obtained through tests and stored in the program memory 15*a*. In accordance with the vehicle speed detected by the vehicle speed sensor, the proper compression ratio and the displacement amount are selected.

This makes the guide frame 17 more accurate.

When backing the vehicle 1, the guide frame 17, the fixed frame 20 and the marker 21 are displayed on the screen 19. However, only information necessary for the current state may be displayed. For example, a switch may be provided for switching the display state when the vehicle 1 is backing in an S-shaped road, parallel parking or perpendicular parking. The driver selects the current situation with a switch to display only the necessary information on the screen 19. The obstacle finder 22 may be displayed only when parallel parking the vehicle 1. Thus, unnecessary information need not be displayed.

Figure 25A:
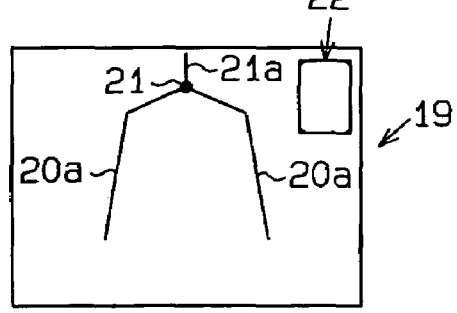
FIGS. 25A and 25B are diagrams showing the locations of a marker on a monitor screen according to another embodiment.
Figure 25B:
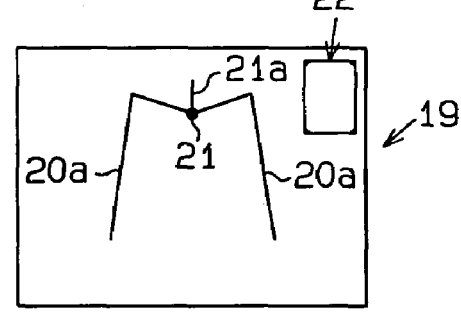
Figure 26:
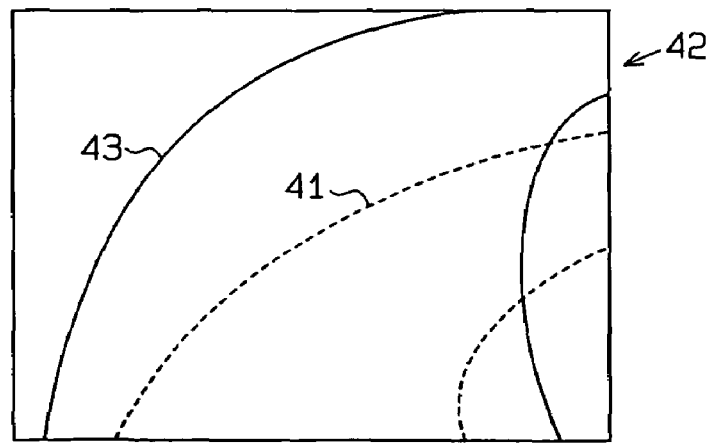
FIG. 26 is a diagram showing a monitor screen of a prior art steering assist apparatus.

In the first embodiment, the line 20*b* of the fixed frame 20 extends between the upper ends of the side lines 20*a*. The marker 21 is located at the center of the line 20*b*. However, the marker 21 is displaced upward or downward of the line 20*a* depending on the turn radius or the value of the overhang. In these cases, the line 20*b* is changed to states shown in FIG. 25A or 25B.

Only one of the guide frame 17 and the marker 21 may be displayed. If only the guide frame 17 is displayed, backing the vehicle 1 in an S-shaped road and perpendicular parking are facilitated. If only the marker 21 is displayed, parallel parking is facilitated.

The marker 21 may be changed as long as it corresponds to the center of the vehicle 1. The line 21*a* may be omitted or be replaced with a dot.

In the first embodiment, the CPU 14 converts a circle of a predicted path into an ellipse and generates the data representing the guide frame 17 based on the ellipse. When displaying the guide frame 17 on the screen 19, the CPU 14 displaces the position of the frame 17 rearward from the accurate location in the screen 19. However, one of the ellipse conversion or the displacement of the frame 17 may be omitted. This reduces the load on the CPU 14.

In the second and third embodiments, the coefficient for computing the correction value of the steering angle is obtained through drive tests. However, the coefficient may be obtained through computation.

Instead of using the monitor 4 of a navigation system, an exclusive monitor may be used for the steering assist apparatus 10. In this case, the apparatus 10 is easily installed in a vehicle having no navigation system.

The obstacle sensors 6 may be provided only at front corners of the vehicle 1. When parallel parking the vehicle 1, only one of the sensors 6, namely the front-one closer to the curb, is needed. Thus, the sensors 6 are not needed for rear corners of the vehicle 1. Alternatively, the obstacle finder 22 may be omitted.

The obstacle finder 22 may be displayed only when one of the sensors 6 outputs a detection signal. Further, the obstacle finder 22 may indicate whether the signal is the first signal or the second signal. In this case, the obstacle finder 22 does not disturb the driver when the driver is checking the guide frame 17.

In the third embodiment, the predicted path is computed based on the vehicle speed detected by the vehicle speed sensor. However, the CPU 14 may receive a vehicle speed signal from a vehicle control ECU.

Therefore, the present examples and embodiments are to be considered as illustrative and not restrictive and the invention is not to be limited to the details given herein, but may be modified within the scope and equivalence of the appended claims.

What is claimed is:

1. An apparatus for aiding steering when a vehicle is being driven in reverse, the moving direction of the vehicle being determined in response to the angle of steered wheels, the apparatus comprising:
   a camera for capturing an image of an area behind the vehicle;
   a monitor for displaying the image captured by the camera;
   a detector for detecting the angle of the steered wheels; and
   a display control unit for displaying a guide marking for aiding steering while a driver operates a steering wheel, the marking and the image being simultaneously displayed on the monitor when the vehicle is being driven in reverse, wherein the marking provides the driver with at least first and second indications, wherein the first indication is a fixed reference guide displaying vehicle width projecting behind the vehicle and continuously showing a path of the vehicle corresponding to the angle of zero degrees of the steered wheels regardless of the current angle of the steered wheels, and wherein the second indication is simultaneously displayed with the first indication and shows a prospective path of the vehicle corresponding to the current angle of the steered wheels detected by the detector.

2. The apparatus as recited in claim 1, wherein the display control unit calculates the prospective path assuming that the vehicle is moved in reverse, on the basis of information from the detector, and wherein the second indication of the marking represents the width of the vehicle and extends behind the rear end of the vehicle by a predetermined distance along the prospective path.

3. The apparatus as recited in claim 2, wherein the second indication of the marking includes a pair of side marks that extends behind the rear end of the vehicle along the prospective path and are spaced apart from each other by the width of the vehicle.

4. The apparatus as recited in claim 2, wherein the second indication of the marking includes an indication defined by two points that are spaced apart approximately by the width of the vehicle in appearance.

5. The apparatus as recited in claim 2, wherein the second indication of the marking includes an end mark that approximately indicates the width of the vehicle in appearance at an apparent predetermined distance behind the rear end of the vehicle on the prospective path and side marks extending from the end mark toward the rear end of the vehicle, wherein the side marks are spaced apart approximately by the apparent width of the vehicle.

6. The apparatus as recited in claim 5, wherein the second indication of the marking further includes two intermediate marks appearing between the end mark and the rear end of the vehicle, each intermediate mark extending between the side marks, wherein the intermediate marks indicate the apparent width of the vehicle.

7. The apparatus as recited in claim 2, wherein the predetermined distance appears to be approximately the same as the wheel base of the vehicle.

8. The apparatus as recited in claim 5, wherein the display control unit calculates the prospective path using polar coordinates and wherein the end mark of the second indication of the marking is determined by a radial line extending from the polar coordinates.

9. The apparatus as recited in claim 2, wherein, when the prospective path is circular, the display control unit displays the path in an elliptical manner by compressing the prospective path in the longitudinal direction of the vehicle at a predetermined rate.

10. The apparatus as recited in claim 2, wherein the display control unit displaces the indication of the prospective path in the direction of vehicle movement on the monitor.

11. The apparatus as recited in claim 2, wherein the display control unit has an acquisition means for determining the steering speed, and wherein the display control unit calculates the prospective path using the current angle of the steered wheels and a value obtained by multiplying the steering speed by a predetermined coefficient.

12. The apparatus as recited in claim 2, wherein the vehicle has vehicle speed sensor for detecting the speed of the vehicle, and the display control unit has an acquisition means for determining the steering speed, and wherein the display control unit calculates the prospective path using the current angle of the steered wheels and a value obtained by multiplying the ratio of the steering speed and the vehicle speed by a predetermined coefficient.

13. The apparatus as recited in claim 1, wherein the image is displayed in black and white and the guide marking is displayed in color.

14. An apparatus for aiding steering when a vehicle is being driven in reverse, the moving direction of the vehicle being determined in response to the angle of steered wheels, the apparatus comprising:
a camera for capturing an image of an area behind the vehicle;
a monitor for displaying the image captured by the camera; and
a display control unit for displaying a marker while a driver operates a steering wheel, the marker being fixed at a predetermined position with respect to the monitor for aiding the driver in parking, the control unit displaying the marker and the image simultaneously on the monitor, wherein the parallel parking is completed by moving the vehicle in reverse so as to cause the marker to coincide with a corner of a parking space displayed on the monitor, followed by backing while keeping the steered wheels turned at their maximum angle.

15. The apparatus as recited in claim 14, wherein the display control unit displays a fixed reference guide on the monitor, wherein the fixed reference guide includes a pair of fixed side marks that are spaced apart approximately by the apparent width of the vehicle and extends behind the rear end of the vehicle, and a fixed end mark that extends laterally to connect ends of the side marks on the monitor, and wherein the marker is positioned at the center of the fixed end mark.

16. The apparatus as recited in claim 14, wherein the marker includes a first marker used when performing parallel parking to the left and a second marker used when performing parallel parking to the right.

17. The apparatus as recited in claim 16, wherein the first marker and the second marker are selectively displayed depending on whether the vehicle is to be parked to the left or to the right.

18. The apparatus as recited in claim 14, wherein the vehicle has obstruction detectors for detecting an obstruction existing near the front corners of the vehicle, and wherein the display control unit displays the presence of the obstruction on the monitor screen on the basis of a signal output from the obstruction detectors.

19. A method for aiding steering when a vehicle is driven in reverse, comprising:
displaying an image captured by a camera on a monitor provided at a driver's seat, wherein the image is of an area behind the vehicle;
detecting the angle of steered wheels of the vehicle;
superimposing and displaying a guide marking upon the image for aiding steering while a driver operates a steering wheel, wherein the guide marking provides the driver with a first indication, which is a fixed reference guide displaying vehicle width projecting behind the vehicle and continuously showing a path of the vehicle corresponding to the angle of zero degrees of the steered wheels regardless of the current angle of the steered wheels, and a second indication simultaneously displayed with the first indication and showing a prospective path of the vehicle, the prospective path depending on the currently detected angle of the steered wheels; and
causing the vehicle to proceed on a route when the vehicle is driven so that the second indication is positioned at a center of the route, the route being an image of a way behind the vehicle actually displayed on the monitor.

20. The apparatus as recited in claim 1, wherein the display control unit includes a correction means for correcting the prospective path, wherein the display control unit generates the second indications based on the corrected prospective path.

21. The apparatus as recited in claim 20, wherein the correction means corrects the prospective path according to the current steering speed of the steered wheels.

* * * * *